(12) United States Patent
Lin et al.

(10) Patent No.: US 7,734,449 B1
(45) Date of Patent: Jun. 8, 2010

(54) NUMERICAL MODELING OF NONLINEAR SHIP-WAVE INTERACTIONS

(75) Inventors: Ray-Qing Lin, Clarksville, MD (US); Weijia Kuang, Columbia, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 849 days.

(21) Appl. No.: 11/518,740

(22) Filed: Sep. 1, 2006

Related U.S. Application Data

(60) Provisional application No. 60/778,166, filed on Feb. 28, 2006.

(51) Int. Cl.
*G06F 17/10* (2006.01)
(52) U.S. Cl. .......................................................... 703/2
(58) Field of Classification Search ...................... 703/2
See application file for complete search history.

(56) References Cited

U.S. PATENT DOCUMENTS 5,089,972 A    2/1992    Nachman et al.

OTHER PUBLICATIONS

J. Farmer, L. Martinelli A. Jameson, A Fast Multigrid Method for Solving the Nonlinear Ship Wave Problem with a Free Surface, 6th International Conference on Numerical Ship Hydrodynamics, Iowa City, Iowa, Aug. 2-5, 1993.*

Ray-Qing Lin and Weijia Kuang, "Nonlinear Ship-Wave Interaction Model, Part 2: Ship Boundary Condition," *Journal of Ship Research*, vol. 50, No. 2, Jun. 2006, pp. 181-186.

Ray-Qing Lin, Weijia Kuang, and Arthur M. Reed, "Numerical Modeling of Nonlinear Interactions between Ships and Surface Gravity Waves, Part 1: Ship Waves in Calm Water," *Journal of Ship Research*, vol. 49, No. 1, Mar. 2005, pp. 1-11.

Ray-Qing Lin and Weijia Kuang, "Nonlinear Waves of a Steadily Moving Ship in Environmental Waves," *Journal of Marine Science and Technology*, vol. 8, Jan. 2004, pp. 109-116.

Ray-Qing Lin and Weijai Kuang, "A Finite Amplitude Steady Ship Motion Model," *Proceedings of the 24th Symposium on Naval Hydrodynamics*, Fukuoka, Japan, Jul. 8-13, 2002, The National Academies Press, Washington, D.C., 2003, pp. 322-332.

(Continued)

*Primary Examiner*—Paul L Rodriguez
*Assistant Examiner*—Luke Osborne
(74) *Attorney, Agent, or Firm*—Howard Kaiser

(57) ABSTRACT

The hydrodynamics of a seagoing vessel are numerically modeled through the present invention's new calculative methodology, which uniquely combines vessel boundary characteristics and pseudo-spectral environmental characteristics. Solutions are obtained through mutual transformations between the vessel boundary's irregular grid and the environment's regular pseudo-spectral grid. The pressure at the vessel boundary, an important component of the vessel boundary itself, can be determined via either (i) finite element analysis (which has a Cartesian framework) or (ii) the present invention's new vessel normal vector analysis (which has a non-Cartesian framework); the latter approach avoids the singularity problem that generally besets hydrodynamics-related mathematics. Typical inventive practice implements a computer processing unit and succeeds in finding superior solutions in shorter CPU durations.

8 Claims, 15 Drawing Sheets

Fr = 0.32

OTHER PUBLICATIONS

Ray-Qing Lin and Will Perrie, "A New Coastal Wave Model, Part III: Nonlinear Wave-Wave Interaction," *Journal of Physical Oceanography*, American Meteorological Society, vol. 27, Sep. 1997, pp. 1813-1826.

U.S. Appl. No. 11/713,838, filed Feb. 22, 2007, entitled "Numerical Modeling of Six-Degree-Freedom Ship Motion," joint inventors Ray-Qing Lin and Weijia Kuang.

U.S. Appl. No. 60/847,396, filed Sep. 15, 2006, entitled "On the Impact of Above Waterline Ship Geometry on Roll Motion," joint inventors Ray-Qing Lin and Weijia Kuang.

U.S. Appl. No. 60/778,166, filed Feb. 28, 2006, entitled "Numerical Modeling of Nonlinear Interactions between Ships and Surface Gravity Waves," joint inventors Ray-Qing Lin and Weijia Kuang.

USPTO communication, U.S. Appl. No 11/713,838, mail date Sep. 10, 2009, 14 pages total, including: cover sheet; Office action (9 pages); Office-acknowledged Information Disclosure Statement by Applicant (2 pages); Office Notice of References Cited (2 pages).

Ray-Qing Lin and Weijia Kuang, "Modeling Nonlinear Roll Damping with a Self-Consistent, Strongly Nonlinear Ship Motion Model," *Journal of Marine Science and Technology*, vol. 13, No. 2, pp. 127-137, Springer Japan (May 2008).

Ray-Qing Lin and Weijia Kuang, "On the Impact of Above Waterline Ship Geometry on Roll Motion," International Conference on Marine Research and Transportation (ICMRT) 2005, the Island of Ischia (Gulf of Naples, Italy), Sep. 19-21, 2005 (6 pages).

Ray-Qing Lin and W. Thomas, "Ship Stability Study in the Coastal Region: New Coastal Wave Model Coupled with a Dynamic Stability Model," Twenty-Third Symposium on Naval Hydrodynamics, Val de Reuil, France, Sep. 17-22, 2000, National Academy of Sciences (2001) (10 pages).

Edwin Kreuzer and Marc-Andre Pick, "Dynamics of Ship-Motion," *Proceedings in Applied Mathematics and Mechanics* (PAMM), vol. 3, Issue 1, pp. 84-87, Wiley-VCH Verlag GmbH & Co., KGaA, Weinheim (2003).

Daohua Zhang and Allen T. Chwang, "On Nonlinear Ship Waves and Wave Resistance Calculations," *Journal of Marine Science and Technology*, vol. 4, No. 1, pp. 7-15, Springer Japan (Sep. 1999).

Michael E. Goss, "Motion Simulation: A Real Time Particle System for Display of Ship Wakes," *IEEE Computer Graphics & Applications*, vol. 10, Issue 3, pp. 30-36 (May 1990).

J.C. Peyton Jones and I. Cankaya, "Polyharmonic Balance Analysis of Nonlinear Ship Roll Response," *Nonlinear Dynamics*, vol. 35, pp. 123-146, Kluwer Academic Publishers, Netherlands (2004).

U.P. Bulgarelli, C. Lugni and M. Landrini, "Numerical Modelling of Free-Surface Flows in Ship Hydrodynamics," *International Journal for Numerical Methods in Fluids*, vol. 43, pp. 465-481, John Wiley & Sons (2003).

E.C. Tupper, *Introduction to Naval Architecture*, Fourth Edition, 2004, Elsevier Ltd, Burlington, MA, title page, publication page, pp. ix-xiii, Chapters 11-15 (pp. 218-327).

James C. Oliver, "A Time Domain Simulation Method for Ship Motion and Load Prediction," Report No. SSC-333, U.S. Coast Guard, Giannotti & Associates Inc., Annapolis, MD, Report Date Feb. 1985, Contract/Grant No. DTCG23-80-C-20032, contract monitored by Ship Research Committee, National Academy of Sciences (196 pages, approx.).

* cited by examiner

Linear Solution for Fr = 0.25

Linear Solution for Fr = 0.316

Linear Solution for Fr = 0.408

Ship Profile for Fr = 0.25

Ship Profile for Fr = 0.316

Ship Profile for Fr = 0.408

Nonlinear Solution for Fr = 0.25
(Present Invention's Pseudo-Spectral Model)

Nonlinear Solution for Fr = 0.316
(Present Invention's Pseudo-Spectral Model)

Nonlinear Solution for Fr = 0.408
(Present Invention's Pseudo-Spectral Model)

Ship Profile for Fr = 0.25

Ship Profile for Fr = 0.316

Ship Profile for Fr = 0.408

Wave Profile for Fr = 0.25

Wave Profile for Fr = 0.316

Wave Profile for Fr = 0.408

Wave Profile for Fr = 0.18

Wave Profile for Fr = 0.25

Wave Profile for Fr = 0.32

Fr = 0.18

Fr = 0.25

Fr = 0.32

NUMERICAL MODELING OF NONLINEAR SHIP-WAVE INTERACTIONS

CROSS-REFERENCE TO RELATED APPLICATIONS

This application claims the benefit of U.S. provisional application No. 60/778,166, filed 28 Feb. 2006, hereby incorporated herein by reference, entitled "Numerical Modeling of Nonlinear Interactions between Ships and Surface Gravity Waves," joint inventors Ray-Qing Lin and Weijia Kuang.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to interactions between marine vessels (e.g., steadily moving ships) and environmental waves, more particularly to methodologies for modeling such interactions.

The past few decades have seen great efforts toward the development of ship motion models. Generally, the ship motion models have been developed via algorithms or formulae based on either linear theory (e.g., Green function) or weakly nonlinear theory. Two major problems hinder the application of these conventional models, viz.: (i) their inability to model strongly nonlinear interactions (e.g., wherein the nonlinear interactions are comparable to or stronger than the linear variations) among surface waves, and among surface waves and ship bodies; (ii) the computationally expensive nature of the backbone algorithms, particularly in solving global wave-like solutions. Therefore, the conventional models are limited to the "mild-condition" applications; that is to say, the conventional models are significantly less than ideal (and may even be impossible) for solving extreme problems, such as storm surges, strong incident waves, and high speed ships. In addition, due to computational costs, the conventional models tend to be less likely than desired to meet real-time or near real-time application requirements.

Lord Kelvin first developed a mathematical description of wave pattern due to a point pressure distribution, the classical V-shaped wave pattern that bears his name; see W. Thompson, "On Ship Waves," Proc. Inst. Mech. Eng., 1887, Reprint, 1891, in *Popular Lectures and Addresses*, 3:450-500, MacMillan, London; W. Thompson, "On the Waves Produced by a Single Impulse in Water of Any Depth, or in a Dispersive Medium," *Proceedings of the Royal Society of London Series A* 42:80-85, 1887.

Michell developed a thin-ship theory for the wave resistance of a ship; see J. H. Michell, "The Wave Resistance of a Ship," *Phil. Mag.* 45:106-23, 1898.

Havelock extended Michell's thin ship theory to predict the wave pattern about the ship; see T. H. Havelock, "The Propagation of Groups of Waves in Dispersive Media, with Application to Waves on Water Produced by a Traveling Disturbance," *Proceedings of the Royal Society of London Series A,* 81:398-430, 1908; T. H. Havelock, "Wave Patterns and Wave Resistance," *Trans. Inst. Nav. Arch.* 76:430-46 (1934).

Tuck developed slender body theory for a ship and the wave field near the ship. See E. O. Tuck, "A Systematic Asymptotic Expansion Procedure for Slender Ships," *Journal of Ship Research* 8(1):15-23, 1964; E. O. Tuck, "On Line Distributions of Kelvin Sources, *Journal of Ship Research* 8(2):45-52, 1964.

Two families of linearized free surface solutions satisfying the exact body boundary condition have been developed, viz., the Neumann-Kelvin methods and Dawson the methods. The Neuman-Kelvin methods linearize the free-surface flow about the free-stream velocity. The Dawson methods linearize the problem about the double-body flow.

The Havelock singularity solution of the Neumann-Kelvin formulation of the ship-wave problem reduces the problem to the solution of an integral equation on the body surface by using a Green function that satisfies explicitly the Laplace equation and the linearized free-surface condition. Doctors together with Beck, and Scragg, have developed Havelock-Green function-based methods for computing the solution of the Kelvin-wake problem; see L. J. Doctors and R. F. Beck, "Numerical Aspects of the Neumann-Kelvin Problem," *Journal of Ship Research* 31:1-13, 1987; L. J. Doctors and R. F. Beck, "Convergence Properties of the Neumann-Kelvin Problem for a Submerged Body," *Journal of Ship Research* 31:227-34, 1987; A. M. Reed, J. G. Telste and C. A. Scragg, "Analysis of Transom Stern Flows," *Proceedings of the 18th Symposium on Naval Hydrodynamics*, Ann Arbor, Mich., pp 207-19, Washington, D.C.: Natl. Acad. Press, 1990.

Doctors & Beck and Scragg solve the full Neumann-Kelvin problem for the strengths of the singularities. Telste (See A. M. Reed, J. G. Telste and C. A. Scragg, "Analysis Of Transom Stern Flows," *Proceedings of the 18th Symposium on Naval Hydrodynamics*, Ann Arbor, Mich., pp 207-19, Washington, D.C.: Natl. Acad. Press, 1990; J. Telste and A. M. Reed, "Calculation of Transom Stern Flows," *Proceedings of the 6th International Conference on Numerical Ship Hydrodynamics*, Iowa City, Iowa, pp 79-92, Washington, D.C.: Natl. Acad. Press, 1993) employs Rankine singularities to solve the Neumann-Kelvin problem, which necessitates distributing Rankine singularities on the free surface as well as on the hull surface.

Dawson methods (See C. W. Dawson, "A Practical Computer Method for Solving Ship Wave Problems," *Proceedings of the 2nd International Conference on Numerical Ship Hydrodynamics*, Berkeley, Calif., pp 30-38, Berkeley, Calif.: Univ. Calif. Berkeley, 1977) solve for the Kelvin wake in a two-stage process. The first step involves the solution of a double-body problem where the ship's hull is reflected in the free surface and the flow is predicted as though the body and its reflected image are submerged infinitely deep in the fluid. The second stage of the solution involves solving a free-surface problem that is linearized around the double-body solution. This second solution involves singularities on the free surface as well as on the body. Compared to the Havelock Green function-based methods, the Dawson methods trade a much simpler Green function for a much larger computational domain with many more unknowns.

Cheng (1989), Kim et al. (1989), Sclavounos & Nakos (1988), and Nakos & Sclavounos (1990) have developed Dawson methods for solving the Kelvin-wake problem using Rankine sources. See B. H. Cheng, "Computations of 3D Transom Stern Flows," *Proceedings of the 5th International Conference on Numerical Ship Hydrodynamics*, Washington, D.C., pp 581-92, Washington, D.C.: Natl. Acad. Press, 1989; Y-H Kim, S. H. Kim and T. Lucas, "Advanced Panel Method for Ship Wave Inviscid Flow Theory (SWIFT)," David Taylor Research Center (DTRC; now NSWCCD), Ship Hydromechanics Department, R & D Report DTRC-89/029, West Bethesda, Md., 66 pp, 1989; P. D. Sclavounos and D. E. Nakos, "Stability Analysis of Panel Methods for Free-Surface Flows with Forward Speed," *Proceedings of the 17th Symposium on Naval Hydrodynamics*, Den Haag, Netherlands, 1988; D. Nakos and P. D. Sclavounos, "Ship Motions by a Three-Dimensional Rankine Panel Method," *Proceedings of the 18th Symposium on Naval Hydrodynamics*, pp 21-41, Ann Arbor, Mich., 1990.

Scragg & Talcott (1990) and Scragg (1999) have developed a "Havelock-Dawson" approach that employs Rankine singularities on the hull and Havelock singularities on the free surface in a limited region of the undisturbed free surface near the body. See C. A. Scragg. and J. C. Talcott., "Numerical Solution of the "Dawson" Free-Surface Problem Using Havelock Singularities," *Proceedings of the 18th Symposium on Naval Hydrodynamics*, Ann Arbor, Mich., pp 259-71, Washington, D.C.: National Academy Press, 1990; C. A. Scragg, "On the Use of Free-Surface Distributions of Havelock Singularities," *Proceedings of the 14th International Workshop on Water Waves and Floating Bodies*, Port Huron, Mich., 4 pp, Ann Arbor, Mich.: Univ. Mich., Dep. Naval Arch. Mar. Eng., 1999. The Havelock-Dawson method allows one to panel only a limited region of the free surface because the singularities satisfy both the linearized free surface and the radiation boundary conditions, resulting in a "self-limiting" distribution of singularities on the free surface. The Havelock-Dawson approach is computationally very efficient.

Most recently, fully nonlinear free surface flow solutions have been developed based on both potential flow and on RANS formulations. Raven (1996, 1998), Subramani (2000), and Wyatt (2000) have published nonlinear potential flow methods for predicting the wave field around ships. See D. C. Wyatt, "Development and Assessment of a Nonlinear Wave Prediction Methodology for Surface Vessels," *Journal of Ship Research* 44:96-107, 2000; A. K. Subramani, "Computations of Highly Nonlinear Free-Surface Flows, with Applications to Arbitrary and Complex Hull Forms," PhD thesis, Dep. Naval Arch. Mar. Eng., Univ. Mich., Ann Arbor, Mich. 127 pp, 2000; H. C. Raven, A *Solution Method for the Nonlinear Ship Wave Resistance Problem*, Wageningen, Netherlands: Marin, 220 pp, 1996; H. C. Raven, "Inviscid Calculations of Ship Wave Making—Capabilities, Limitations, and Prospects," *Proceedings of the 22nd Symposium on Naval Hydrodynamics*, Washington, D.C., pp 738-54, Washington, D.C.: Natl. Acad. Press, 1998.

All three authors in the preceding paragraph employ Rankine singularities and desingularize the free surface. Several authors have published the results from free-surface RANS codes that can solve the steady-ship wave problem. See A. Arabshahi, M. Beddhu, W. Briley, J. Chen, A. Gaither, et al., "A Perspective on Naval Hydrodynamic Flow Simulations," Proceedings of the 22nd Symposium on Naval Hydrodynamics, Washington, D.C., pp 920-34, Washington, D.C.: Natl. Acad. Press, 1998; see also, R. Wilson, E. Paterson, and F. Stern, "Unsteady RANS CFD Method for Naval Combatants in Waves," Proceedings of the 22nd Symposium on. Naval Hydrodynamics, Washington, D.C., pp 532-49, Washington, D.C.: Natl. Acad. Press, 1998.

These codes solve the field equations using a finite volume or finite difference scheme. Each satisfies the full nonlinear free-surface boundary condition by employing some type of upstream differencing scheme on the free surface. The fact that the fluid volume must be re-gridded to track the nonlinear free-surface deformation adds a significant complication to the iteration scheme and adds significantly to the computation time. Solutions using nonlinear free-surface RANS codes such as these can take 40-80 hours or more to compute on a state-of-the-art multiprocessor super computer.

In parallel with the above studies, effort has recently been focused on interactions between ship waves and ambient waves because they cannot be well described by linear superposition (See, e.g., M. St. Denis and W. J. Pierson, "On the Motions of Ships in Confused Seas," *SNAME Transactions*, Vol. 61, 1953); Y. Liu, D. G. Dommermuth, and D. K. P. Yue, "A high-order spectral method for nonlinear wave-body interactions," *Journal of Fluid Mechanics*, 245:115-136, 1992) first used a high-order spectral method to study nonlinear interactions among surface waves and ship. Their model was developed originally by Dommermuth and Yue (See D. G. Dommermuth and D. K. P. Yue, "Numerical Simulations Of Nonlinear Axisymmetric Flows With A Free Surface," *Journal of Fluid Mechanics* 209, 57, 1987) to study nonlinear gravity wave interactions based on the third-order Zakharov equation. See R.-Q. Lin, and W. Perrie, "A New Coastal Wave Model, Part III: Nonlinear Wave-Wave Interaction for Wave Spectral Evolution," *Journal of Physical Oceanography*, 27:1813-26, 1997; D. R. Crawford, B. M. Lake, P. G. Saffman, and H. C. Yuen, "Stability of Weakly Nonlinear Deep-Water Waves in Two and Three Dimensions," *Journal of Fluid Mechanics*, 105:177-191, 1982.

However, the Zakharov Equation, and the Hasselmann Equation (See S. Hasselmann and K. Hasselmann, "A Symmetrical Method of Computing the Nonlinear Transfer in a Gravity-Wave Spectrum," *Hamb. Geophys. Einzelschriften Reihe A Wiss. Abhand*, Vol. 52, 138 pp, 1981), which is similar to the Zakharov equation, are both derived using perturbation methods, which implies that the equations are not appropriate for problems with large wave steepness. For example, the maximum wave steepness for the Zakharov equation is 0.3, with a 10 percent error level. With the similar error, the Hasselmann equation only allows wave steepness up to 0.06; see R.-Q. Lin and W. Perrie, "A New Coastal Wave Model, Part III: Nonlinear Wave-Wave Interaction for Wave Spectral Evolution," *Journal of Physical Oceanography*, 27:1813-26, 1997.

In addition, the model of Liu et al. (1992) can only solve interactions between a cylinder and surface waves, while ships have much more complicated geometries. The solutions of Liu et al. can be extended to more complicated problems by applying conformal mappings, but this imposes constraints on the flow properties and on the ship geometries. In order to resolve arbitrary ship shapes, boundary element methods are introduced in modeling finite amplitude ship-wave interactions. See, e.g., W. M. Lin and D. K. P. Yue, "Numerical Solution for Large-Amplitude Ship Motions in Time-Domain," *Proceedings of the 18th Symposium on Naval Hydrodynamics*, U. Michigan, Ann Arbor, Mich., 1990; W. M. Lin, M. J. Meinhold, N. Salvesen, and D. K. P. Yue, "Large-Amplitude Motions and Wave Load for Ship Design," *Proceedings of the 20th Symposium on Naval Hydrodynamics*, U. California, Santa Barbara, Calif., 1994; Lin and Yue, 1990; Liu et al., 1992, 1994; M. Xue, "Three-Dimensional Fully-Nonlinear Simulations of Waves and Wave Body Interactions," Ph.D. Thesis, Dept Ocean Engineering, MIT, 1997; M. Xue, H. Xü, Y. Liu, and D. K. P. Yue, "Computations of Full Nonlinear Three-Dimensional Wave-Wave and Wave-Body Interactions. Part I. Dynamics of Steep Three-Dimensional Waves," *Journal of Fluid Mechanics*, 438:11-39. 2001; Xue, 1997; Xue et al, 2000; Y. Liu, M. Xue, and D. K. P, Yue, "Computations of Fully Nonlinear Three-Dimensional Wave-Wave Wave-Body Interactions, Part 2: Nonlinear Waves and Forces," *Journal of Fluid Mechanics*, 438:41-66, 2000.

Though the boundary element method (and other local methods) is very good for resolving flow near the boundaries of arbitrary ships, it is not very efficient in resolving the waves away from the ship. This problem can be very serious when ambient waves are present. In this case, fine-scale grids are necessary to resolve small-scale waves and wave-wave interactions. Insufficient resolution can easily result in numerical instabilities. On the other hand, spectral methods can take advantage of the wave-like motions at the surface away from the ship. In particular, by selecting appropriate base wave functions for spectral expansion, one can easily model surface waves and wave-wave interactions with high computational efficiency. Furthermore, one can model wave-breaking mechanisms that are important in studying finite amplitude wave-wave interactions. Because of these numerical advantages, ship hydrodynamics models based on spectral methods have been developed. For example, Liu et al. (1992) developed a spectral model to study interaction between incident waves and a cylinder (an idealized ship).

However, the spectral method is not very efficient in solving for the local flow structures near the ship. For example, a very fine ship will generate very small-scale flow near the ship. Resolving this small-scale flow with spectral methods requires a very high truncation order, not necessary for the flow away from ship. In addition, traditional periodic boundary conditions used in modeling wave-wave interactions (See, e.g., R.-Q Lin and W. Kuang, "Nonlinear Wave-Wave Interactions of Finite Amplitude Gravity Wave," *Recent Developments in Physical Oceanography* 8:109-116, 2004) are not applicable to ship-wave interaction problems. An example is the case of a ship moving in calm water where there are no waves ahead of the ship but waves extend behind the ship to infinity, where there can be no periodic far-field boundary conditions.

In ship-wave hydrodynamics, the flow is assumed to be an incompressible, inviscid potential flow. Therefore, singularities occur in solving flow at the ship boundary, particularly at bow and stern points. Resolving the flow near the ends of the ship is one of the important problems in ship hydrodynamics, and is particularly critical for correct evaluation of the pressure on a moving ship. In the past, researchers developed various approximations and techniques to avoid the singularities. As previously mentioned herein, Michell (1898) developed thin ship theory, which was further refined by Havelock (1908, 1934). Tuck (1964) developed slender theory for a ship and the wave field near the ship. Similar methods were developed in (linear and nonlinear) studies using the exact ship boundary condition, e.g. Doctors & Beck (1987), Scragg (Reed et al. 1990), Telste (Reed et al. 1990, Telste & Reed 1993), and Liu et al. (2000). These approaches to solving the velocity potential at the ship boundary depend on certain "cut-off" domains (e.g., truncation in wave number space of integrals for the wave components of the potential, or truncation of the Fourier series of the spectral representation). In addition, computations with arbitrary ship geometries can be very expensive, because high numerical resolution is required to avoid numerical errors and instabilities.

SUMMARY OF THE INVENTION

In view of the foregoing, it is an object of the present invention to provide a robust numerical model that can be used to study nonlinear interactions between steadily moving ships and environmental waves.

Another object of the present invention is to provide such a model that is sufficiently flexible for arbitrary single-hull and multi-hull ships.

A further object of the present invention is to provide such a model that is sufficiently flexible for extreme environmental conditions.

It is a another object of the present invention to provide such a model that is computationally efficient.

It is a further object of the present invention to provide such a model that is capable of real-time or near-real-time applications.

The present invention provides a pseudo-spectral model for nonlinear ship-surface wave interactions. The algorithm used in the inventive model represents a combination including spectral and boundary element methods. The boundary element method is used to translate physical quantities between the non-uniform ship surface and the regular grid of the spectral representation; the spectral method is used throughout the remainder of the fluid domain. All possible wave-wave interactions are included in the inventive model (up to N-wave interactions for the truncation order N of the spectral expansions). The instant disclosure focuses on the mathematical theory and numerical method of the inventive model and presents some numerical results for steady Kelvin waves in calm water. The nonlinear bow waves at high Froude numbers from the inventive pseudo-spectral model are much closer to the experimental results than those from linear ship wave models.

The present inventors' results demonstrate that the present invention's pseudo-spectral model is significantly faster than previous ship wave models; with the same resolution, the CPU time of the pseudo-spectral model is orders of magnitude less than those of previous models. For instance, convergence speed of the inventive model is $ANLogN$ instead of $BN^2$, where N is the number of unknowns. Note that the N for the traditional boundary element method may be significantly larger than the N for the inventive pseudo-spectral method for the same quality solution. A and B are CPU time requirements in each time step for the inventive model and for other models, respectively.

To solve the problems of the existing ship motion models, the present inventors started by modeling ship motions from the fundamental equations derived from the first principles. According to this approach, the present inventors introduced no approximation on the nonlinearity in their model, thereby ensuring that their ensuing model shall be applicable to any ship motion studies, including those of extreme environment (where nonlinear interaction is the strongest). In furtherance of numerical stability and efficiency, the present inventors introduced a new approach on solving pressure on the ship boundaries, this new approach ensuring that their new model can work with arbitrary ship boundaries, especially those causing mathematical stiffness. In addition, the present inventors created an interpolation algorithm to map between the localized ship grid systems and the (global) pseudo-spectral grid systems.

With their inventions, the present inventors avail themselves of the combined numerical advantages of pseudo-spectral algorithms (for global surface waves) and finite difference/finite element algorithms (for local ship boundaries). The combination of these two types of algorithms can dramatically reduce computational costs, making the real-time or near real-time applications feasible. The present invention as typically practiced features, inter alia: (a) inclusion of full nonlinear interactions (in the inventive model); (b) combination of pseudo-spectral algorithms and finite difference/finite element algorithms; and, (c) evaluation of pressure correction on the ship boundaries. Inventive feature (a) promotes the capability of the inventive model of being applied to the studies of arbitrary ship motions in any environment. Inventive features (b) and (c) promote the numerical stability and efficiency of the inventive model, such attributes being necessary for real-time or near real-time applications.

One of the main problems in modeling ship-wave hydrodynamics is solving for the forcing (pressure) at the ship boundary. With an arbitrary ship, singularities occur in evaluating the velocity potential and the velocities on the hull. Inaccuracies in the evaluation of the singular terms in the velocity potential result in discretization errors, numerical errors and excessive computational costs. The present invention uses a pseudo-spectral method to solve the velocity potential at the ship boundary in Cartesian coordinates; however, like other methods such as disclosed by Tuck (1964), Doctors & Beck (1987), Scragg (Reed et al. 1990), Telste (Reed et al. 1990, Telste & Reed 1993), and Liu et al. (2000), the present invention's more traditional approach to solving the velocity potential at the ship boundary depends on certain "cut-off" domains (e.g., truncation in wave number space of integrals for the wave components of the potential, or truncation of the Fourier series of the spectral representation).

As alternative to their new but more traditional approach, the present inventors disclose herein a new and totally untraditional approach to evaluating the pressure on a ship: evaluating the pressure in the ship normal vector coordinate system. The present invention's more traditional approach evaluates the pressure (velocity potential) at the ship boundary in a Cartesian coordinate system; in contrast, the present invention's entirely untraditional approach evaluates the pressure (velocity potential) at the ship boundary in a non-Cartesian, ship normal vector coordinate system. The main advantage of the latter (non-Cartesian) inventive approach is that p is a smooth function in the ship normal vector coordinate system, enabling the inventive practitioner to obtain accurate results very efficiently (e.g., in much less CPU time) without encountering numerical difficulties arising from possible singularities.

According to the present invention's ship-wave numerical model, a pseudo-spectral method and a boundary element representation of the ship are combined to solve for the velocity potential. To improve numerical efficiency and accuracy in modeling ship hydrodynamic problems, a central issue is to resolve appropriately the velocity potential near ship boundaries. The present invention's alternative, non-Cartesian approach is to solve the flow near the ship boundary in a coordinate system different from the normal Cartesian coordinate in which the far-field flow is well defined. The special coordinate system is defined with the ship boundary normal vectors, in which the pressure is a smooth function. The present invention thereby avoids the difficulties associated with the singularities in the velocity potential.

Spectral (e.g., pseudo-spectral) method is capable of studying the strong nonlinear interactions between a ship body and the environment (e.g., the incident waves). For instance, spectral method can be used to study winter storms or hurricanes that impact motions of a ship. However, spectral method is incapable of studying the complicated ship body itself. In contrast, finite element method (also known as finite different method or panel method) is capable of studying the complicated ship body, but is incapable of studying the strong nonlinear interactions between a ship body and the environment (e.g., the incident waves). The present invention, as frequently practiced, succeeds in using both spectral method and finite element method to holistically model the hydrodynamics of the seagoing ship as it interacts with its environment. The term "ship," as used herein in relation to practice of the present invention, broadly refers to any marine or water-going (e.g., sea-going or ocean-going) vessel, since inventive principles are broadly applicable to any such vessel.

According to typical inventive practice, a numerical method for modeling hydrodynamics of a ship and water waves comprises: (a) determining a boundary described by a ship; (b) determining a nonlinear interaction between the ship and incident waves; and, (c) mutually transforming information between the boundary and the nonlinear interaction. The determination of the nonlinear interaction includes using spectral method, a known genre of mathematical technique. More specifically, usually preferred inventive practice provides for use of "pseudo-spectral" method, a known type of spectral method, for nonlinear interaction determination. The ship boundary is characterized by irregular body points on the ship. The nonlinear interaction is characterized by regular pseudo-spectral collocation points. The mutual transformation of information includes mutually transforming grid-related information between the irregular body points and the regular pseudo-spectral collocation points. As the present invention is frequently practiced, the present invention's unique mutual transformation methodology succeeds in transferring information between the ship's body and the ship's environment in each time step. According to typical inventive practice, the determination of the ship boundary includes determination of the pressure at the ship boundary. According to some inventive embodiments, the determination of the pressure is contextualized in a Cartesian coordinate system and includes use of finite element method. According to other inventive embodiments, the determination of the pressure is contextualized in a ship normal vector coordinate system, the present invention's unique form of a non-Cartesian coordinate system.

The present invention's novel non-Cartesian approach to pressure determination is both accurate and efficient, as it eliminates unwanted mathematical singularities that are associated with all other approaches to pressure determination. Every other pressure determination methodology requires truncation of at least one singularity; in contrast, the inventive non-Cartesian pressure determination methodology avoids any such artificial effect on its solutions. The present invention's ship normal vector coordinate system mode of determination of pressure includes: (a) establishing a pressure dichotomy and (b) obtaining the "ship-present" pressure. The pressure dichotomy is of a ship-absent pressure kind and a ship-present pressure kind. The ship-absence pressure is characterized by absence of the ship; the ship-present pressure kind is characterized by presence of the ship. The ship-absent pressure kind includes a ship-absent pressure $p_f$ and a ship-absent modified pressure $p^*$; the ship-present pressure kind includes a ship-present pressure p and a ship-present pressure correction $\Delta p$. The ship-present pressure p is the pressure being solved for. The ship-present pressure p is obtained based on the ship-absent pressure $p_f$ and the ship-present pressure correction $\Delta p$. The ship-present pressure p is defined as the sum of the ship-absent pressure $p_f$ and the ship-present pressure correction $\Delta p$. The ship-absent pressure $p_f$ is related to the ship-absent modified pressure $p^*$. The ship-present pressure p is related to the ship-present pressure correction $\Delta p$. According to typical inventive practice, the ship-absent pressure $p_f$ is related to said ship-absent modified pressure $p^*$ in accordance with the equation $$p^* \equiv \frac{p_f}{\rho} + \frac{1}{2}(\nabla \psi)^2,$$

and the ship-present pressure p is related to said ship-present pressure correction Δp in accordance with the equation $$\frac{\Delta p}{\rho} = \frac{1}{2}[(\nabla \psi)^2 - (\nabla \varphi)^2] - u_s \cdot (\nabla \psi - \nabla \varphi) + \frac{\partial}{\partial t}(\psi - \varphi) + \nu \nabla^2 (\psi - \varphi).$$

The present invention's non-Cartesian determination of pressure on a ship body can be practiced either as included in or independent of the present invention's method for modeling the hydrodynamics of a ship navigating in and/or on water waves, and can be embodied as, e.g., a method, an apparatus including a machine having a memory, or a computer program product.

Aspects of the present invention are disclosed in the following two papers, incorporated herein by reference, of which the present inventors are co-authors: Ray-Qing Lin, Weijia Kuang, and Arthur M. Reed, "Numerical Modeling of Nonlinear Interactions between Ships and Surface Gravity Waves, Part 1: Ship Waves in Calm Water," Journal of Ship Research, Volume 49, Number 1, March 2005, pages 1-11; Ray-Qing Lin and Weijia Kuang, "Nonlinear Ship-Wave Interaction Model, Part 2: Ship Boundary Condition," Journal of Ship Research, Volume 50, Number 2, June 2006, pages 181-186.

Also incorporated herein by reference are the following pertinent papers: Ray-Qing Lin and Weijia Kuang, "Nonlinear Waves of a Steadily Moving Ship in Environmental Waves," *Journal of Marine Science and Technology*, Volume 8, January 2004, pages 109-116; Ray-Qing Lin and Weijai Kuang, "A Finite Amplitude Steady Ship Motion Model," *Proceedings of the Twenty-Fourth Symposium on Naval Hydrodynamics*, Fukuoka, Japan, 8-13 Jul. 2002, The National Academies Press, Washington, D.C., 2003, pages 322-332; Ray-Qing Lin and Will Perrie, "A New Coastal Wave Model, Part III: Nonlinear Wave-Wave Interaction," *Journal of Physical Oceanography*, American Meteorological Society, Volume 27, September 1997, pages 1813-1826.

Other objects, advantages and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein:

In FIG. 1(a), Froude number=0.25. In FIG. 1(b), Froude number=0.316. In FIG. 1(c), Froude number=0.408. The contour line interval is 0.0033*Froude number; the contour line intervals are 0.000825, 0.001043, and 0.001346, respectively, in FIG. 1(a), FIG. 1(b) and FIG. 1(c). The maximum values are 0.014, 0.018, and 0.024, respectively, in FIG. 1(a), FIG. 1(b) and FIG. 1(c). The minimum values are −0.014, −0.018, and −0.024, respectively, in FIG. 1(a), FIG. 1(b) and FIG. 1(c).

In FIG. 2(a), (a) Froude number=0.25. In FIG. 2(b), Froude number=0.316. In FIG. 2(c), Froude number=0.408. In each of FIGS. 2(a), 2(b) and 2(c), the wave profile is normalized by ship length=100 m.

In FIG. 3(a), Froude number=0.25. In FIG. 3(b), Froude number=0.316. In FIG. 3(c), Froude number=0.408. The contour line interval is 0.0033*Froude number; the contour line intervals are 0.000825, 0.001043, and 0.001346, respectively, in FIG. 3(a), FIG. 3(b) and FIG. 3(c). The maximum values are 0.014, 0.018, and 0.024, respectively, in FIG. 3(a), FIG. 3(b) and FIG. 3(c). The minimum values are −0.014, −0.018, and −0.024, respectively, in FIG. 3(a), FIG. 3(b) and FIG. 3(c). The minimum values for FIG. 3(a), FIG. 3(b) and FIG. 3(c) are the same as for FIG. 1(a), FIG. 1(b) and FIG. 1(c), respectively.

In FIG. 4(a), Froude number=0.25. In FIG. 4(b), Froude number=0.316. In FIG. 4(c), Froude number=0.408. In each of FIGS. 4(a), 4(b) and 4(c), the wave profile is normalized by ship length=100 m.

In FIG. 6(a), Froude number=0.25. In FIG. 6(b), Froude number=0.316. In FIG. 6(c), Froude number=0.408. In each of FIGS. 6(a), 6(b) and 6(c), the wave profile is normalized by ship length=100 m.

In FIG. 7(a), Froude number=0.18. In FIG. 7(b), Froude number=0.25. In FIG. 7(c), Froude number=0.32. In each of FIGS. 7(a), 7(b) and 7(c), the wave profile is normalized by ship length=100 m.

In FIG. 8(a), Froude number=0.18. In FIG. 8(b), Froude number=0.25. In FIG. 8(c), Froude number=0.32. The contour line intervals are 0.0006. The maximum values are 0.006, 0.012, and 0.017, respectively. The minimum values are −0.006, −0.012, and −0.017, respectively.

DETAILED DESCRIPTION OF THE PRESENT INVENTION

Figure 1A:
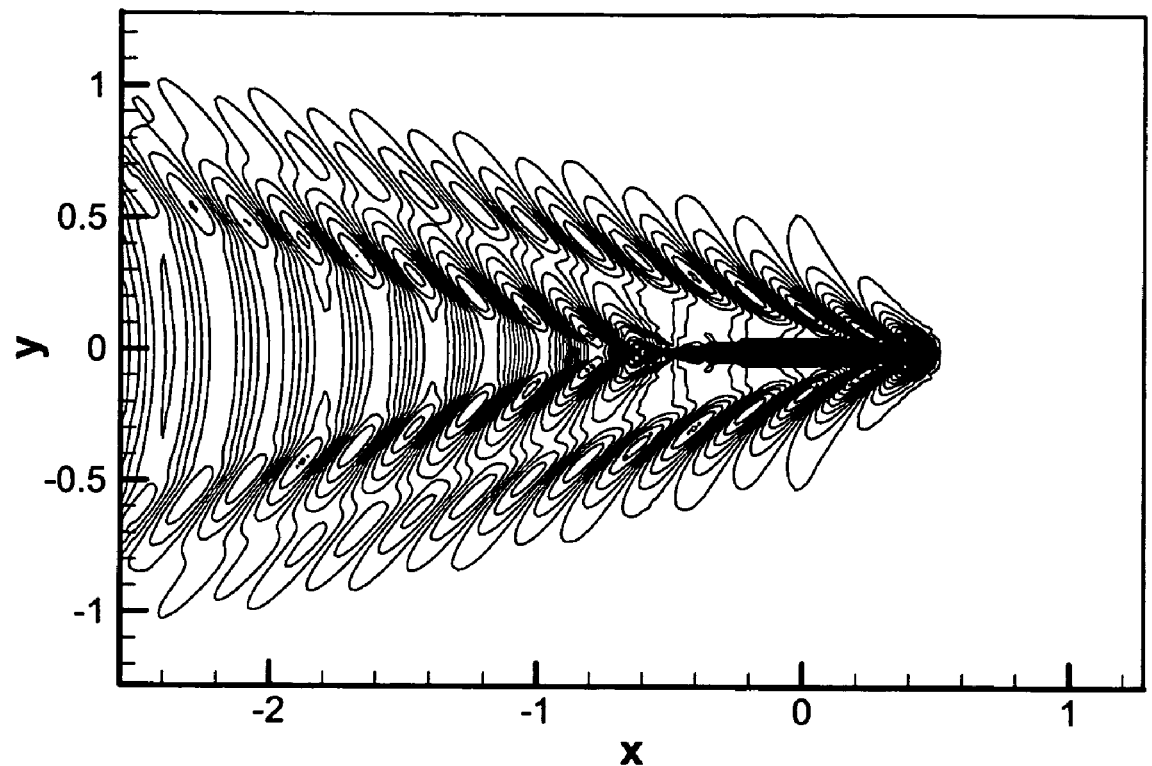
FIG. 1(a), FIG. 1(b) and FIG. 1(c) are graphical representations showing two-dimensional linear ship waves in calm water.

The present inventors disclose herein their development of their pseudo-spectral ship-wave interaction model, which as typically embodied is characterized by a mixed algorithm that affords advantages of both spectral method and boundary element method. The mathematical foundation of the inventive model and the results of ship moving in calm water are presented hereinbelow. The present invention's basic equations and boundary conditions are summarized in the first section, entitled "Mathematical Model." The present invention's numerical methods are described in the second section, entitled "Numerical Method." The present invention's results for steady motion of a ship in calm water are given in the third section, entitled "Benchmark Results," which is followed by more general discussion regarding the present invention in the fourth section, entitled "Concluding Remarks."

Mathematical Model

The present invention solves the wave-ship interaction problem by defining physical quantities in a reference frame moving (translating) with the ship (such reference frame hereinafter referred to as the "moving reference frame"). The present invention assumes that the fluid is incompressible. The ship moves with a given velocity $u_s$. The incompressibility is described by $$\nabla^2 \varphi \equiv \nabla_h^2 \varphi + \frac{\partial^2 \varphi}{\partial z^2} = 0 \text{ for } -H \leq z \leq \eta. \quad (1)$$

where $\nabla_h$ is the horizontal gradient, and $\varphi$ is the velocity potential perturbed from the uniform flow $u_s$ in the moving reference frame.

The dynamic and kinematic boundary conditions at the free surface, $z=\eta$ (where $\eta$ is the free surface elevation) are $$\frac{\partial \varphi}{\partial t} + \left(\frac{1}{2}\nabla\varphi + u_s\right) \cdot \nabla\varphi + g\eta + \frac{p}{\rho} + \frac{\partial u_s}{\partial t} \cdot x - \nu \nabla_h^2 \varphi = 0, \quad (2)$$

$$\frac{\partial \eta}{\partial t} + (\nabla_h \eta) \cdot (\nabla_h \varphi + u_s) = \frac{\partial \varphi}{\partial z}, \quad (3)$$

where p is the pressure, $\rho$ is the fluid density, v is the kinematic viscosity of the fluid, and x is the position vector. It should be pointed out here that the inventors introduce some dissipation in Equation (2) for future modeling of wave-breaking mechanisms; viscous dissipation vanishes in potential flow.

The bottom is impenetrable at the bottom z=−H:

$$\frac{\partial \varphi}{\partial z} + (\nabla_h H) \cdot (\nabla_h \varphi + u_s) = 0. \quad (4)$$

Two more boundary conditions are required when a ship is included in the model. One is the impenetrability boundary condition on the ship boundary Γ:

$$\hat{n} \cdot (\nabla \varphi + u_s) = 0, \quad (5)$$

where $\hat{n}$ is the unit vector of the ship boundary. The other boundary condition is the radiation boundary condition to insure that the waves generated by the ship are left behind the ship and do not radiate ahead of the ship. It is implemented as open boundary conditions away from the ship (the far field). For the computational application, the far-field boundary conditions are defined at a finite distance from the ship (instead of the asymptotic limit x→∞):

$$\frac{\partial \varphi}{\partial x} = \frac{\partial \varphi_e}{\partial x} - u_s, \quad \eta = \eta_e; x = b \quad (6)$$

$$\nabla \cdot \phi = \nabla \phi_e + (\nabla \phi_s - \overline{\nabla \phi_s}) - u_s; \eta = \eta_e + (\eta_s - \overline{\eta_s}); x = c \quad (7)$$

where b is the forward boundary, c are the side and aft boundaries, $\phi_e$ and $\eta_e$ are the velocity potential and the surface elevation of the environmental waves, $\phi_s$ and $\eta_s$ are the corresponding quantities of other waves associated with the ship (e.g. ship generated waves and the waves arising from ship-environmental wave interactions) The over bar means the spatial average of the quantities. We should point out that the boundary conditions are consistent with mass conservation. In calm water, $\phi_e$ and $\eta_e$ vanish.

We consider again a ship moving in the water of finite depth $-H \leq z \leq \zeta$ with horizontal velocity $u_s$. In the reference frame moving with $u_s$ an incompressible potential flow $\phi$ is described by the following equations in the domain $-H \leq z \leq \zeta$ $$\nabla^2 \varphi \equiv \nabla_h^2 \varphi + \frac{\partial^2 \varphi}{\partial z^2} = 0, \quad (1)$$

A Bernoulli's equation relates the fluid pressure to the velocity in the fluid. On the free surface $z=\zeta$, this equation provides the dynamics boundary condition $$\frac{\partial \varphi}{\partial t} + \left(\frac{1}{2}\nabla\varphi - u_s\right) \cdot \nabla\varphi + gz + \frac{p}{\rho} - \nu \nabla_h^2 \varphi = 0, \quad (2.1)$$

and the kinematic boundary condition at the free surface $z=\zeta$ is $$\frac{\partial \zeta}{\partial t} + (\nabla_H \zeta) \cdot (\nabla_H \varphi - u_s) = \frac{\partial \varphi}{\partial z}. \quad (3.1)$$

In the above equations, g is the gravitational acceleration, p is the modified pressure, $\nabla_h$ is the horizontal gradient, and $\nu$ is the artificial dissipation coefficient. The artificial dissipation serves two purposes, viz.: (1) to model very small fluid viscosity and wave-breaking mechanisms; and, (2) to speed up numerical convergence without distorting large-scale flow structures in which we are interested. The modified pressure defined in (2) and the pressure $p_E$ defined in a earth-fixed reference frame is $$p = p_E - \frac{1}{2}\rho u_s^2.$$

In addition to above equations, the potential shall also satisfy the impenetrable boundary conditions on the solid surfaces, namely: on the flat bottom that is $$\frac{\partial \varphi}{\partial z} = 0 \text{ for } z = -H, \quad (4.1)$$

and on the ship $$\hat{n} \cdot \nabla \phi = \hat{n} \cdot u_s \text{ for } x \in \Gamma, \quad (5.1)$$

where $\hat{n}$ is the normal vector into the fluid on the ship surface $\Gamma$.

In general, the computational domain is small compared to the entire domain of fluid with its surface waves. In our model, the computational domain is bounded by a forward boundary $\Gamma_f$, the side and the aft boundaries $\Gamma_a$. Therefore additional boundary conditions are needed on these boundaries to approximate the far-field radiation condition (as $x \to \infty$). On the forward boundary $\Gamma_f$, the velocity potential $\phi$ and the surface elevation $\zeta$ should be equivalent to those of the incident waves. Thus, in a reference frame moving with the ship, $$\nabla \phi = \nabla \phi_e \text{ and } \zeta = \zeta_e \text{ for } x \in \Gamma_f \quad (6.1)$$

where the subscript "e" denotes the quantities for the incident waves. It should be pointed out that $\phi_e$ and $\zeta_e$ vanish in calm water. On the other boundaries $\Gamma_a$, we impose no constraint on the flow. However, since the fluid is incompressible, the total mass in the computational domain must be conserved. Therefore the net flux across the boundaries should vanish. This implies that $$\overline{(\nabla \phi)} = \overline{(\nabla \phi)_e} \text{ and } \overline{\zeta} = \overline{\zeta_e} \text{ for } x \in \Gamma_a \quad (7.1)$$

where $\overline{(*)}$ means the spatial average on the boundaries $\Gamma_a$.

Numerical Method

The present invention solves the fully nonlinear equations (2) and (3) via a pseudo-spectral method. For pertinent information, see C. Canuto, M. Y. Hussaini, A. Quarteroni, and T. A. Zang, *Spectral Methods in Fluid Dynamics*, Spring-Verlag, Berlin Heidelberg, 1988. A typical embodiment of the present invention's pseudo-spectral method can be summarized as follows. First, the velocity potential $\phi$ and the free surface elevation $\eta$ are expanded in Fourier series:

$$\begin{bmatrix} \eta(x,y,t) \\ \varphi(x,y,z,t) \end{bmatrix} = \sum_{m \leq M, n \leq N} \begin{bmatrix} a_{m,n}(t) \\ b_{m,n}(t,z) \end{bmatrix} e^{i(k_m x + k_n y)} + c.c., \quad (8)$$

where $(k_m, k_n)$ are discrete wave numbers, $(M, N)$ are the truncation order, and c.c. stands for the complex conjugate. Specific choice of the discrete wave numbers $(k_m, k_n)$ depends on the peak wave number $k_p$.

Fast Fourier Transforms (FFT) are used for spatial integration, in which $\phi$ and $\eta$ are transformed between the physical space and the spectral space. A third-order Runge-Kutta method (See W. B. Press, B. P. Flannery, S. A. Teukolsky, and W. T. Vetterling, Numerical Recipes: *The Art of Scientific Computing*, 818 pp, 1986) is applied for time integration.

The bottom roughness $$\tilde{H} = \frac{H}{\overline{H}}$$

($\overline{H}$ is average water depth) and the free surface elevation $\eta$ are now discussed in more detail. From Equation (1) and Equation (4) we observe that a spatially varying $\tilde{H}$ could create very complicated $b_{m,n}$, negating all gains on computational efficiency with the spectral expansion Equation (8). However, if $|\nabla_h \tilde{H}| \ll 1$ and $|\tilde{H} - \hat{H}| \ll 1$, (i.e. $\hat{H}$ is close to the mean depth and its spatial length is long compared to the typical wavelength of the surface gravity waves), the leading order solution can be expanded as Equation (8). Higher order corrections can be easily achieved via Taylor expansion of the coefficients. Similar approaches can be applied to $\eta$. Evaluation of Equation (8) using FFT can be a problem if $|\eta| \approx \tilde{H}$. When the magnitude of the bottom roughness is very large, and/or the spatial length scales are very small, the spectral method may still be an efficient approach on some carefully designed, stretched, coordinate systems.

In order to study ship-wave interactions for arbitrary bodies, one must model the ship boundary very accurately, because the pressure distribution near the boundary is the driving force for the ship-generated surface waves. Normally, a ship can be very accurately resolved by clustering more grid points in the regions where the ship geometry varies rapidly. Therefore, the uniform collocation points of the spectral representation are less than ideal for arbitrary bodies. Furthermore, ship hull forms are defined on surface grids that are very different from the uniform grid of the spectral method collocation points. To resolve these problems, we introduce a grid point transformation between the uniform collocation points of the spectral method and the non-uniform grid points of the ship surface. The ship geometry (e.g. ship boundary points and the normal vectors on the hull surface) and flow variables (e.g. velocity, pressure) in the vicinity of the ship are also transformed between the grid points and collocation points.

The ship boundary condition Equation (5) can be solved in several different ways. An effective numerical approach is to replace (5) by the following two equivalent conditions: and $$\hat{n} \cdot \nabla \phi(t=0) = 0, \quad (9)$$

and $$\hat{n} \cdot \nabla \frac{\partial \varphi(t)}{\partial t} + \frac{\partial \hat{n}}{\partial t} \cdot \nabla \varphi(t) = 0. \quad (10)$$

The second term in Equation (10) accounts for the rotation of the ship:

$$\frac{\partial \hat{n}}{\partial t} \cdot \varphi = (\omega \times \hat{n}) \cdot \nabla \varphi. \quad (11)$$

It vanishes for a steadily moving ship. By Equation (2) and Equation (10), we have $$\hat{n} \cdot \nabla \tilde{p} = \quad (12)$$

$$-\hat{n} \cdot \nabla \left[ \alpha^2 (\nabla_h \varphi) \left( \frac{1}{2} \nabla_h \varphi + \frac{1}{\alpha} v_s \right) + \left( \frac{\partial \varphi}{\partial z} \right) \left( \frac{1}{2} \frac{\partial \varphi}{\partial z} + v_{sz} \right) + \eta - \varepsilon \nabla_h^2 \varphi \right] +$$

$$(\dot{u} \times \hat{n}) \cdot \nabla \varphi \text{ at } z = \eta.$$

To obtain the pressure itself, we use the following finite difference approximation. Assuming that $x_\Gamma$ is a point on the ship boundary, and $x_\Gamma + \delta x = (x_\Gamma + \delta x, y_\Gamma + \delta y, z_\Gamma + \delta z)$ is the nearest point on the spectral grid in the fluid outside the ship, then we can approximate the pressure as $$\tilde{p}(x_\Gamma, y_\Gamma, z_\Gamma) \approx \left[\frac{\hat{n}_x}{\delta_x}\tilde{p}(x_\Gamma + \delta_x, y_\Gamma, z_\Gamma) + \right. \quad (13)$$

$$\left. \frac{\hat{n}_y}{\delta_y}\tilde{p}(x_\Gamma, y_\Gamma + \delta_y, z_\Gamma) + \frac{\hat{n}_z}{\delta_z}\tilde{p}(x_\Gamma, y_\Gamma, z_\Gamma + \delta_z)\right] - \delta\hat{n}\cdot\nabla\varphi,$$

where $1/\delta \equiv \hat{n}_x/\delta x + \hat{n}_y/\delta y + \hat{n}_z/\delta z$.

The term in brackets in Equation (12) can be divided into two parts, viz., $g_1$ and $g_2$:

$$g_1 = -\hat{n}\cdot\nabla\eta(x,y) = -\hat{n}\cdot\nabla z_\Gamma(x,y) = -\frac{\hat{n}_x^2 + \hat{n}_y^2}{\hat{n}_z} = \hat{n}_z - \frac{1}{\hat{n}_z}. \quad (14a)$$

It is explicit that the points are mathematically singular if $\hat{n}_z = 0$. The bow and the stern of the ship are two singular points. To avoid the mathematical singularity, the present invention approximates $\hat{n}_z$ at these points by $$\hat{n}_z \approx \beta,$$

where $\beta \equiv \hat{n}_z^{np}/\delta$ ($\delta$ is the parameter describing the numerical resolution) and $\hat{n}_z^{np}$ is the minimum value of the neighboring points on the ship boundary $\Gamma$. The remainder of the term in brackets, $g_2$ is $$g_2 = -\hat{n}\cdot\nabla\left[\alpha^2(\nabla_h\varphi)\left(\frac{1}{2}\nabla_h\varphi + \frac{1}{\alpha}v_s\right) + \left(\frac{\partial\varphi}{\partial z}\right)\left(\frac{1}{2}\frac{\partial\varphi}{\partial z} + v_{sz}\right) - \varepsilon\nabla_h^2\varphi\right]. \quad (14b)$$

With the above approximations, we can evaluate the pressure, and the velocity, near the ship boundary. To transform the variables from the irregular local grid points on the ship boundary to regular, uniform collocation points, we apply a bi-linear interpolation. Assume that $f(x,y)$ and $f(x^*,y^*)$ are the values of the variable on the collocation points $(x,y)$ and on the irregular local grid points $(x^*,y^*)$ of the ship boundary. Then, we have:

$$f(x^*, y^*) = \frac{1}{2}\left[\left(1 - \frac{x^* - x}{dx}\right)\left(1 - \frac{y^* - y}{dy}\right)f(x,y) + \right. \quad (15)$$

$$\left(1 - \frac{x + dx - x^*}{dx}\right)\left(1 - \frac{y^* - y}{dy}\right)f(x+dx, y) +$$

$$\left(1 - \frac{x^* - x}{dx}\right)\left(1 - \frac{y + dy - y^*}{dy}\right)f(x, y+dy) +$$

$$\left.\left(1 - \frac{x + dx - x^*}{dx}\right)\left(1 - \frac{y + dy - y^*}{dy}\right)f(x+dx, y+dy)\right],$$

where $(dx, dy)$ denote the grid sizes. Similar expressions apply to the reversed transform from $(x,y)$ to $(x^*,y^*)$. With this transformation, we can evaluate the flow variables near the ship surface on the collocation points, which can then be transformed to wave number space via FFT. These procedures are repeated at each time step in the present invention's pseudo-spectral numerical model.

The flow structures near the ship are often smaller than those far from the ship. Therefore, we do not need to apply fine numerical resolution throughout the entire computational domain. To take advantage of this, we introduce a multi-domain approach, in which the entire domain is divided into several sub-domains. Different numerical resolutions are used in the sub-domains to reduce the computational cost, without compromise on convergence rate. The division and the numerical resolutions depend on specific problems under consideration.

For example, to study a steady ship motion in calm water, it is sufficient to have three sub-domains, with the center domain containing the ship, and one sub-domain on each side of the center domain. In the center domain, a fine spatial resolution of the truncation order (N=96, M=192) is applied so that approximations Equation (13) and Equation (15) can be evaluated very accurately. In the two side domains, a coarser spatial resolution of (N=64, M=128) is adopted. To speed up the simulation, the dimensions of the sub-domains are decided according to the truncation level and the smallest length scale necessary for numerical convergence. To match solutions in adjacent sub-domains, we allow small overlapping areas between them, and apply matching boundary conditions in the overlapping areas. In the steady ship motion problem, we first solve the flow in the center sub-domain via open boundary conditions:

$$\frac{\partial\varphi_{c(I,K)}}{\partial x} = -v_{s,x} + \left(\frac{\partial\varphi_{(I,K)}}{\partial x}\right)', \quad (16)$$

$$\frac{\partial\varphi_{c(I,K)}}{\partial y} = -v_{s,y} + \left(\frac{\partial\varphi_{(I,K)}}{\partial y}\right)',$$

where the subscript "c" denotes the variables in the center sub-domain, (I,K) are the points on the boundaries, $v_{s,x}$ and $v_{s,y}$ are the components of the ship velocity, and the prime means the departure from the mean value $f' \equiv f - \bar{f}$.

After obtaining the solutions in the center sub-domain, we use the flow in the overlapping regions as the incoming flow for the relevant sub-domains. If numerical convergence is achieved in the center sub-domain, the higher order spectral coefficients of the solution are negligible.

Solving the far-field boundary conditions Equation (6) and Equation (7) are another challenge to the pseudo-spectral approach. The expansions Equation (8) imply intrinsically that solutions on the boundaries are periodic. This may require un-necessarily large numerical domain (so that the ship-generated waves will be asymptotically damped in far field), and thus demand un-reasonable computational resources. Therefore we need to modify the flow properties in the far field to satisfy the asymptotic conditions Equation (6) and Equation (7). The approach that the present invention uses is to assume open boundaries. The boundary conditions in the far field ahead of the ship are $$\Phi = \phi_e - u_s x,$$

$$\eta = \eta_e. \quad (17)$$

In the far-field on the sides of and behind the ship we have $$\varphi = \varphi_e + \varphi_{(i)}\cos^\beta\left(\left|\frac{x_i - x_{o(i)}}{l}\right|\frac{\pi}{2}\right) - v\cdot x, \quad (18)$$

$$\eta = \eta_e + \eta_{(i)}\cos^\beta\left(\left|\frac{x_i - x_{o(i)}}{l}\right|\frac{\pi}{2}\right),$$

where $l$ is a scaling constant, $\beta$ is a numerical dissipation parameter, $\{x_{o(i)}\}$ and $\{x_i\}$ are the ship positions and the spectral grid points outside the ship, respectively. In the numerical solutions presented in this paper, $l$ is chosen to be the distance between the ship and the far-field boundaries, and β=0.0625. With this approximation, the size of the computational domain can be significantly reduced, thus drastically increasing the computational efficiency.

To solve the free surface B and C, Equations (2) and (3), we start from either the trivial initial solution $$a_{mn}(t_o)=b_{mn}(t_o)=0,$$

or a solution from a previous simulation. Then the pressure field on the ship surface is updated by (13), and the spectral coefficients ($a_{mn}$, $b_{mn}$) are updated by (2) and (3). In this process, the pressure field $\tilde{P}$ is transformed between the irregular ship surface grid and the regular spectral collocation points. The nonlinear terms in Equation (2) and Equation (3) are transformed between the physical space and spectral space via FFT.

The time step δt is updated via CFL condition at every step:

$$\delta t \le CFL, \quad CFL = \min\left[\sqrt{\left(\frac{\partial \varphi}{\partial x}\Big/\Delta x\right)^2 + \left(\frac{\partial \varphi}{\partial y}\Big/\Delta y\right)^2 + \left(\frac{\partial \varphi}{\partial z}\Big/\Delta z\right)^2}\right]^{-1/2}.$$

Since the transient period is very short, time integration is more efficient than iterative methods to obtain a strongly nonlinear steady state solution. With the present invention's pseudo-spectral model, for example, the steady solution in the FIG. 4(c) is obtained with 4 seconds CPU time on a CRAY computer. But it requires approximately one hour and ten minutes of CPU time on the same machine with the state-of-the-art LAMP (large-amplitude ship motion program) model currently available. The difference in CPU time increases significantly for problems with large Froude numbers, or with multi-ship bodies. For example, the Lewis-form catamaran at Froude number=1.0 (See R.-Q Lin, A. Reed, and W. Beknep, "Full Nonlinear Wave-Wave Interactions between a High-Speed Vessel and Incident Waves," *Proceedings of FAST, Vol.* 1, Session A3, 1-8 Oct. 2003) can be solved by the present invention's model with five minutes of CPU time on a Dell laptop; in contrast, it needs five days by LAMP on the same machine.

Described hereinabove are the inventive pseudo-spectral model together with the inventive method by which the ship body boundary condition (Equation (5); Equation (5.1)) is satisfied (e.g., defined via boundary elements). Next is described the pressure on a moving ship in the ship normal vector coordinates, in accordance with some embodiments of the present invention. Focused upon hereinbelow is the inventive approach to evaluating the smooth pressure field on the ship Γ.

Directly solving the Neumann boundary condition (Equation (5); Equation (5.1)) is one of the most expensive tasks in fluid dynamic modeling; it is complicated not only by irregular grids describing arbitrary ship geometries, but also by the demand of very high (local) numerical resolution near the boundary. In order to avoid these numerical difficulties, the present invention adopts an alternative approach that uses the pressure correction to replace the Neumann condition (Equation (5); Equation (5.1)) on the ship surface.

To explain this inventive approach, we first consider the case without a ship (ship-free). Denote by ψ the velocity potential and $p_f$ the associated pressure in this case, and introduce the modified pressure $$p^* \equiv \frac{p_f}{\rho} + \frac{1}{2}(\nabla \psi)^2. \quad (19)$$

The Bernoulli's equation (Equation (2)) can then be re-written as $$\frac{\partial \psi}{\partial t} - u_s \cdot \nabla \psi = -p^* - gz + \nu \nabla_H^2 \psi. \quad (20)$$

By Equations (1), (4.1), (19) and (20), we have $$\nabla p^* = 0 \text{ for } -H \le z \le \zeta, \quad (21)$$

$$p^* = \frac{1}{2}(\nabla \psi)^2 \text{ at } z = \zeta, \quad (22)$$

$$\frac{\partial p^*}{\partial z} = -g \text{ at } z = -H. \quad (23)$$

This set of equations (viz., Equations (21) through (23)) can be used to solve the modified pressure p*. With spectral algorithm, p* is expanded as $$p^* = \sum_{m,n=0}^{M,N} \tilde{p}_{mn}(z) e^{i(k_m x + k_n y)} + c.c., \quad (24)$$

where ($k_m$, $k_n$) are wave numbers. With Equations (21) and (23), one can obtain $$p^* = -gz + \sum_{k_{mn} \ne 0} q_{mn} \cosh k_{mn}(z + H) e^{i(k_m x + k_n y)} + c.c., \quad (25)$$

where $k_{mn} \equiv (k_m^2 + k_n^2)^{1/2}$ is the total wave number. The spectral coefficients $q_{mn}$ are then determined by Equation (22).

When a ship is present, one could describe its effect as a correction Δp added to the ship-free pressure $p_f$:

$$p = p_f + \Delta p. \quad (26)$$

This pressure correction Δp results in the difference in the equation (2):

$$\frac{\Delta p}{\rho} = \frac{1}{2}[(\nabla \psi)^2 - (\nabla \varphi)^2] - u_s \cdot (\nabla \psi - \nabla \varphi) + \frac{\partial}{\partial t}(\psi - \varphi) + \nu \nabla^2 (\psi - \varphi). \quad (27)$$

Since the fluid viscosity ν is small, the last term is negligible for the large-scale flow under consideration. The time derivative vanishes in steady flow, and is small with normal ship acceleration and with slowly time-varying incident waves (compared to spatial variation of the waves). Therefore, we assume that on the ship boundary Γ, the last two terms in Equation (27) are small compared to the other terms. We also know, based on general fluid dynamics, that the spatial variation of the flow normal to a solid boundary is larger than that parallel to the boundary (except in rare cases where the length scale of boundary shape variation is comparable to the thickness of the boundary layers). Thus, we assume that the pressure correction is largely due to variations of the velocity potential normal to the ship boundary Γ. With these approximations, (16) is reduced to $$\frac{\Delta p}{\rho} = \frac{1}{2}[(\hat{n} \cdot \nabla \psi)^2 - (\hat{n} \cdot \nabla \varphi)^2] - (\hat{n} \cdot u_s)(\hat{n} \cdot \nabla \psi - \hat{n} \cdot \nabla \varphi) \quad (28)$$

$$= \frac{1}{2}[(\hat{n} \cdot \nabla \psi)^2 + (\hat{n} \cdot u_s)^2] - (\hat{n} \cdot u_s)(\hat{n} \cdot \nabla \psi)$$

on Γ. In deriving the above formulation, the boundary condition Equation (5) is used. Since $p_f$ is determined through p*, the full pressure Equation (15) with the ship present can then be obtained using Equation (15) and Equation (16).

With this inventive approach, the ship body boundary condition (Equation (5); Equation (5.1)) is not directly coded into the present invention's model; instead, the ship body boundary condition (Equation (5); Equation (5.1)) is implemented through the pressure correction (Equation (28)), which can be efficiently evaluated via the present invention's pseudo-spectral method.

Benchmark Results

To benchmark the present invention's pseudo-spectral model, we use the well-known Wigley hull form defined as:

$$y = \frac{B}{2}[1 - 4x^2]\left[1 - \left(\frac{z}{D}\right)^2\right], \quad (29)$$

where B and D are the non-dimensional beam and draft of the ship, x is the longitudinal coordinate, positive in the direction of ship movement, and y is the orthogonal transverse coordinate, positive to port. As is typical, D=0.0625, and B=0.1. The normal vector $(n_x, n_y, n_z)$ is equal to:

$$n_x = \frac{\frac{\partial z}{\partial x}}{\sqrt{1 + \left(\frac{\partial z}{\partial x}\right)^2 + \left(\frac{\partial z}{\partial y}\right)^2}};$$

$$n_y = \frac{\frac{\partial z}{\partial y}}{\sqrt{1 + \left(\frac{\partial z}{\partial x}\right)^2 + \left(\frac{\partial z}{\partial y}\right)^2}};$$

$$n_z = \frac{-1}{\sqrt{1 + \left(\frac{\partial z}{\partial x}\right)^2 + \left(\frac{\partial z}{\partial y}\right)^2}};$$

For a mathematical ship, such as the Wigley ship given by Equation (29), the normal vector can be calculated analytically, but for an arbitrary real ship, the normal vector is calculated numerically.

The free surface has 1,512 points, and the ship surface is also defined by 1,512 points. In all cases, the ship is fixed in calm water.

Hereinbelow the present invention's pseudo-spectral model results are compared with the experimental data at slow, medium, and fast ship speeds. The Froude numbers are 0.25, 0.316, and 0.408. First, the present invention's pseudo-spectral linear model results are compared with experimental data. Second, the present invention's pseudo-spectral nonlinear model results are compared with the present invention's pseudo-spectral linear model results and with the experimental data.

Figure 3A:
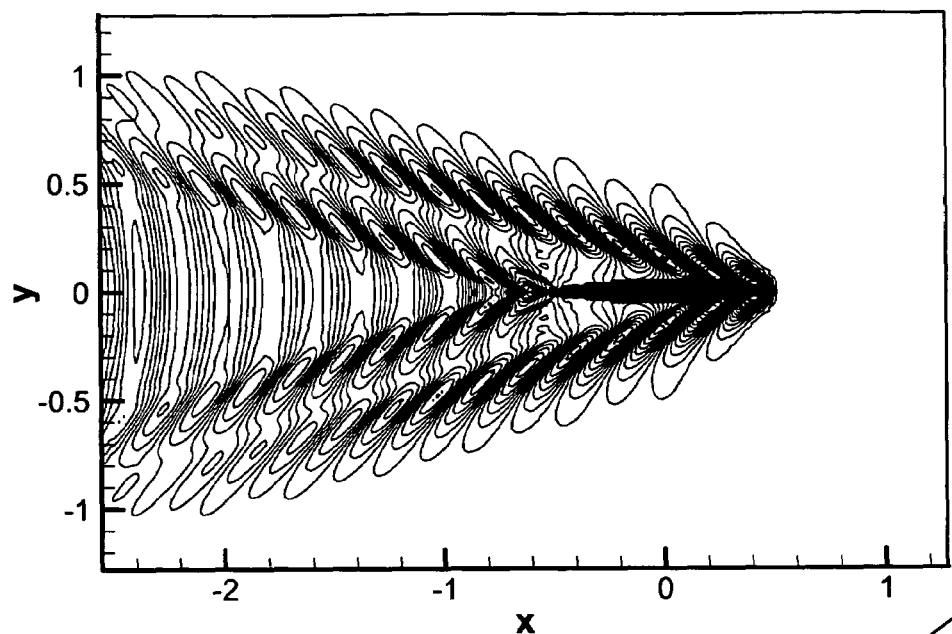
FIG. 3(a), FIG. 3(b) and FIG. 3(c) are graphical representations showing two-dimensional fully nonlinear ship waves in calm water, in accordance with the present invention.
Figure 3A:
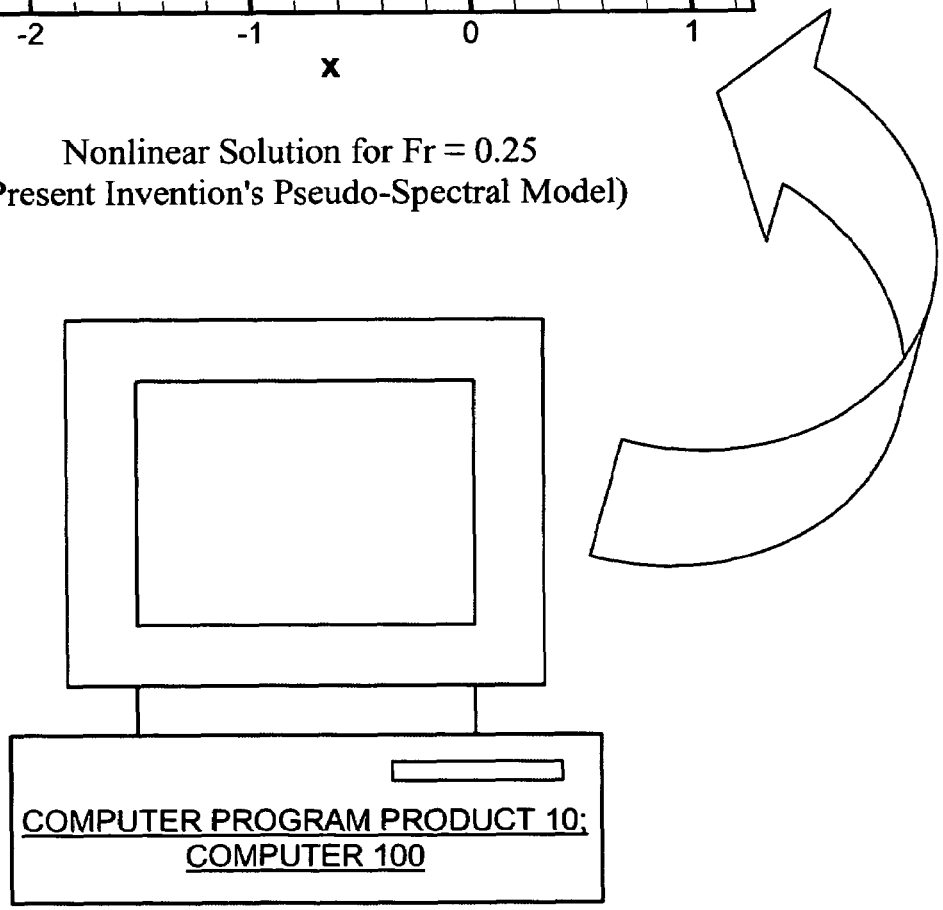
Figure 3B:
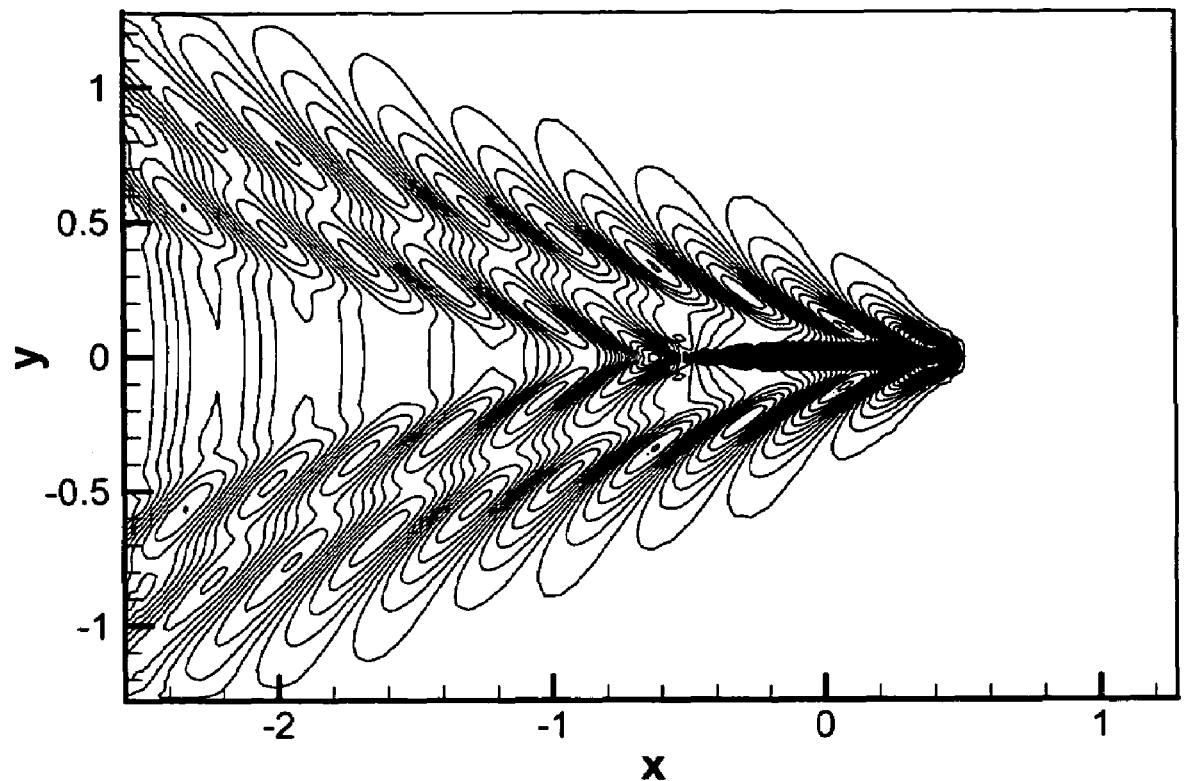
Figure 3C:
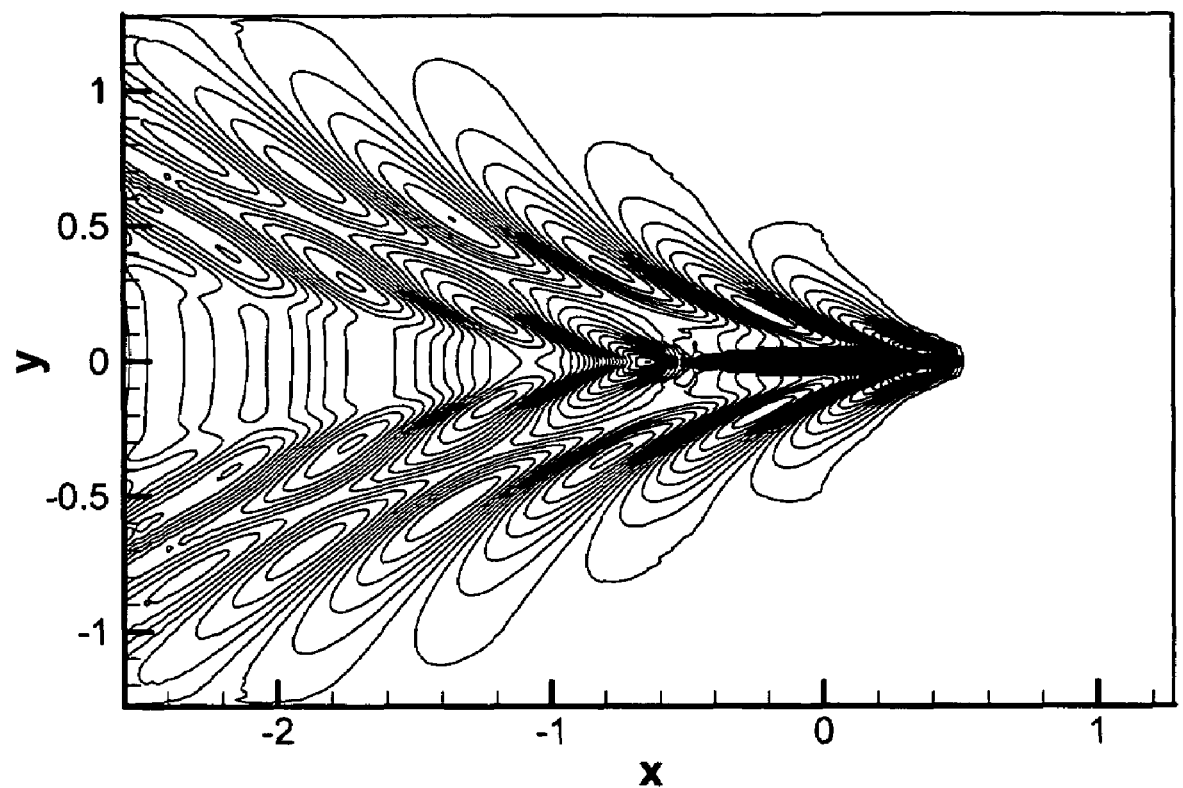

Any aspect or group of aspects of the present invention admits of embodiment as a method, an apparatus (e.g., comprising a machine having a memory), or a computer program product. Typical inventive practice provides for utilization of a computer (including a processor) for rendering mathematical determinations in accordance with inventive principles. A computer program product (e.g., algorithmic software) embodying one or more aspects of the present invention is resident in the memory of the computer. FIG. 3(a) is diagrammatically illustrative of residence of the present invention's computer program product 10 in the memory of the present invention's computer 100. FIG. 3(a) is generally representative of the involvement of computers in practice of the present invention in any or all of its aspects. The graph in FIG. 3(a) is shown connected to computer 100 by way of example, as an inventive computer program product 10 can be used to generate multifarious types of information.

(i) Linear Model Results in Calm Water

Figure 1B:
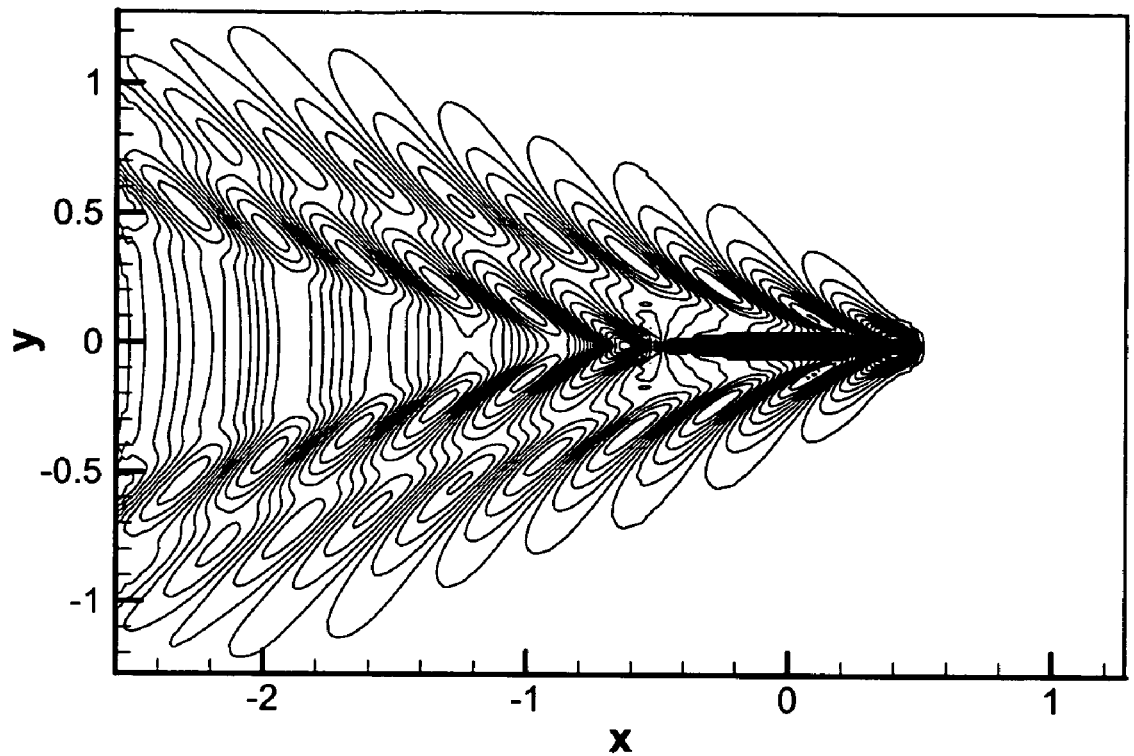
Figure 1C:
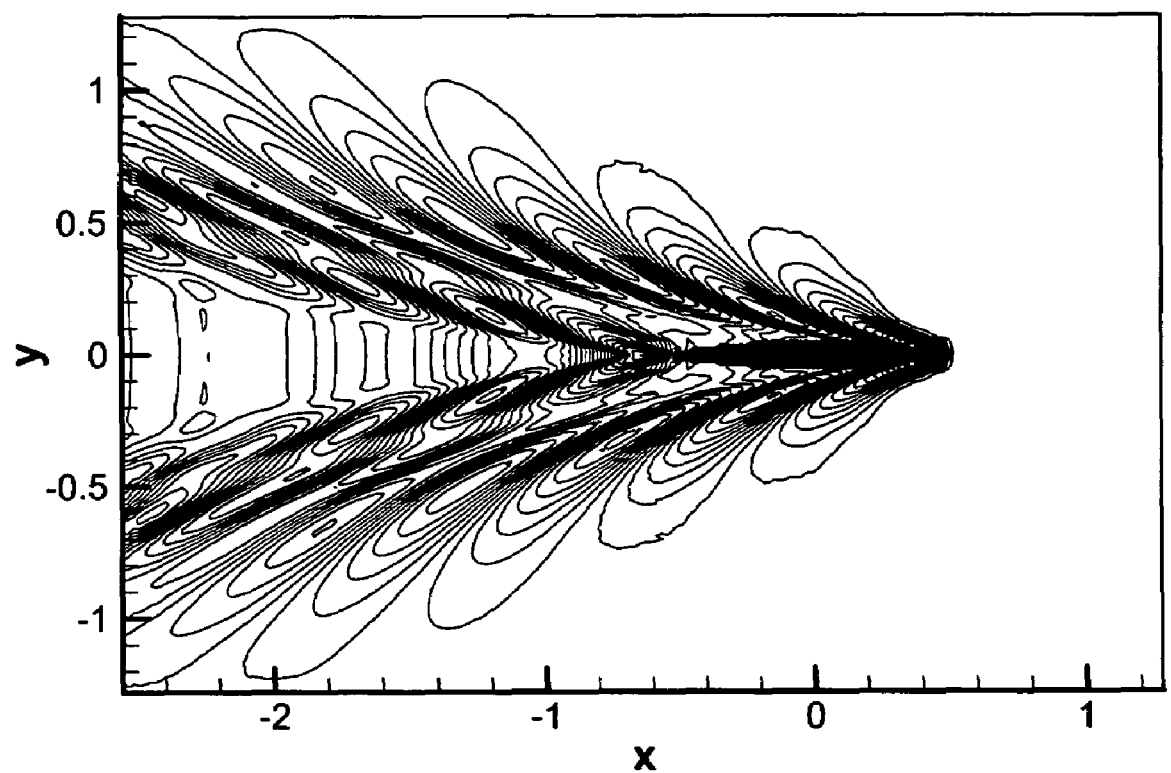

FIG. 1(a), FIG. 1(b) and FIG. 1(c) show two-dimensional ship waves contours for the Wigley hull, (a) Froude number=0.25, (b) Froude number=0.316, and (c) Froude number=0.408. The ship wave patterns shown in FIG. 1(a) through FIG. 1(c) are linear solutions obtained using the present invention's pseudo-spectral model. Similar linear solutions are obtainable using known linear methods. It is seen, for instance, that these ship wave patterns are similar to those of Yang et al (2000); see C. Yang, R. Lohner and F. Noblesse, "Far-Field Extension of Near-Field Steady Ship Waves," Ship Tech. Res., 47:22-34, 2000.

Since we use different contour levels and a grid different from Yang et al. (See C. Yang, C. R. Löhner, F. Noblesse and T. T. Huang, "Calculation of Ship Sinkage and Trim Using Unstructured Grids," European Congress Computational Methods in Applied Sciences and Engineering, ECCOMAS 2000, Barcelona, 2000), we cannot compare the present invention's pseudo-spectral linear results with Yang et al (2000). The wave length, the spread distance in the y-direction, as well as the free surface elevation, are strongest at higher Froude numbers, such as shown in FIG. 1(c). These features decrease with decreasing Froude number.

Figure 2A:
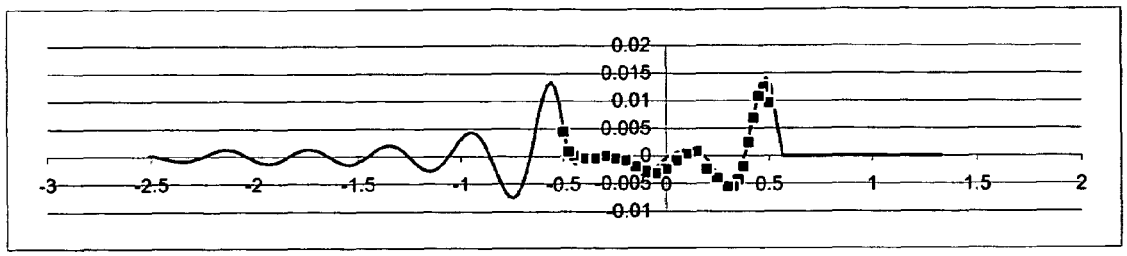
FIG. 2(a), FIG. 2(b) and FIG. 2(c) are graphical representations showing the linear wave profiles around the ship in calm water.
Figure 2B:
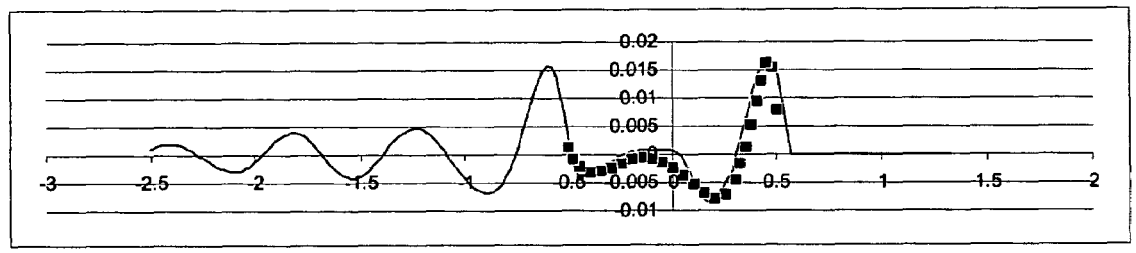
Figure 2C:
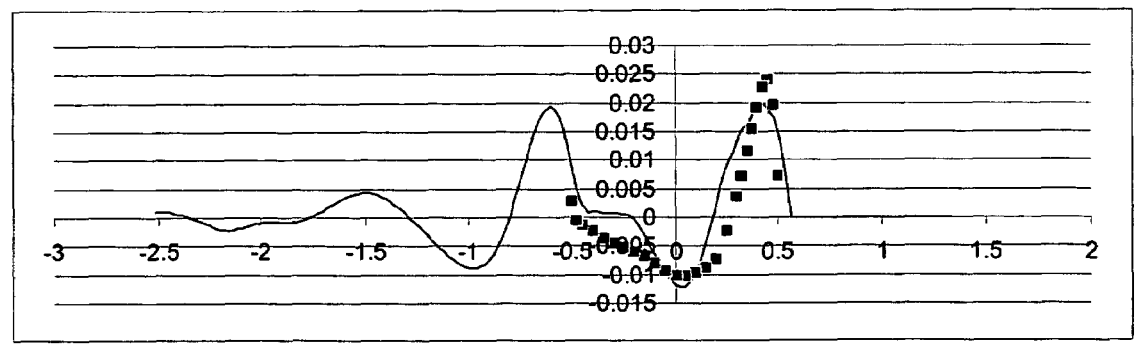

FIG. 2(a), FIG. 2(b) and FIG. 2(c) show the normalized linear wave profiles around the ship, obtained via the present invention's pseudo-spectral model. Again, similar linear solutions can be obtained via known linear methods. The horizontal axis is along the ship center and normalized by ship length. The bow of the ship is at 0.5 and the stern of the ship is at −0.5. The vertical axis is wave amplitude and normalized also by ship length. The solid line represents the linear solution by the present invention's pseudo-spectral model. The dots represent the measurement. In FIG. 2(a), Fr=0.25; in FIG. 2(b), Fr=0.316; in FIG. 2(c), Fr=0.408. The measurement error at full scale is 6 cm. The scale by the ship length (100 m) will be 0.0006, which is too small to show in FIG. 2(a) through FIG. 2(c).

For quantitative comparison, as shown in FIG. 2(a) through 2(c), the linear wave profiles that are based on the present invention's pseudo-spectral model are plotted against the experimental measurements from the University of Tokyo (See *Cooperative Experiments on Wigley Parabolic Models in Japan*, Report to the 17$^{th}$ ITTC Resistance Committee, ITTC, 1983). The linear pseudo-spectral ship wave profiles are shown with the experimental measurements in FIG. 2(*a*), FIG. 2(*b*) and FIG. 2(*c*), where the solid line represents the computational results, and the points represent the measurements. In FIG. 2(*a*), (*a*) Froude number=0.25; in FIG. 2(*b*), Froude number=0.316; in FIG. 2(*c*), Froude number=0.408. The ship is moving in the positive x-direction; the bow is at +0.5, and the stern is at −0.5. In FIG. 2(*a*), the computed results agree well with the measurements. In FIG. 2(*b*), the computed bow wave height is less than the measurement by about 6 percent, and FIG. 2(*c*) shows that the computed linear bow wave is about 20 percent less than the measurement. This discrepancy is similar to the numerical results of Yang et al. (2000) when sinkage and trim are not included.

The above results show that the computed linear ship wave profiles agree well with the measurements when the Froude number is small. The difference between the computed results and the measurements increases as the Froude number increases. In this study, we have not included sinkage and trim. Beyond the bow wave, the computed wave profiles along the ship also show some differences relative to the measurements. When the Froude number is small, such as in FIG. 2(*a*), one may not able to see the differences; however, when the Froude number increases, the differences increase, as is seen in FIG. 2(*c*). The present invention's predicted wave profile near the bow of the inventive model is smaller than the measurements, and the present invention's predicted wave profile near the stern of the inventive model is higher than the measurements.

(ii) Nonlinear Model Results in Calm Water

This subsection compares the present invention's nonlinear pseudo-spectral results with the inventively obtained linear pseudo-spectral results, and with the measurements from University of Tokyo. FIG. 3(*a*), FIG. 3(*b*) and FIG. 3(*c*) show the wave contours by the present invention's pseudo-spectral nonlinear model, (a) Froude number=0.25, (b) Froude number=0.316, and (c) Froude number=0.408. Shown in FIG. 3(*a*) through FIG. 3(*c*) are the wave patterns from the present invention's nonlinear ship motion solutions for Wigley Hull. The wave contours are plotted using the same contour levels as used in FIG. 1(*a*) through FIG. 1(*c*).

The ship wave patterns shown in FIG. 3(*a*) through FIG. 3(*c*) are nonlinear solutions obtained using the present invention's pseudo-spectral model. The present invention's nonlinear solutions are truly unique solutions that cannot be obtained or mimicked in any other manner. The nonlinear wave contours shown in FIG. 3(*a*) through FIG. 3(*c*) are quite similar to the linear wave contours shown in FIG. 1(*a*) through FIG. 1(*c*). This indicates that the nonlinearity of ship waves has not significantly impacted the far-field ship wave features in calm water.

Figure 4A:
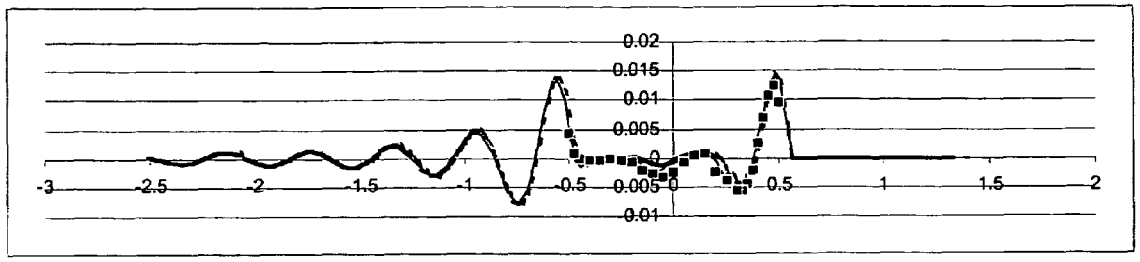
FIG. 4(a), FIG. 4(b) and FIG. 4(c) are graphical representations showing the full nonlinear wave profiles around the ship in calm water.
Figure 4B:
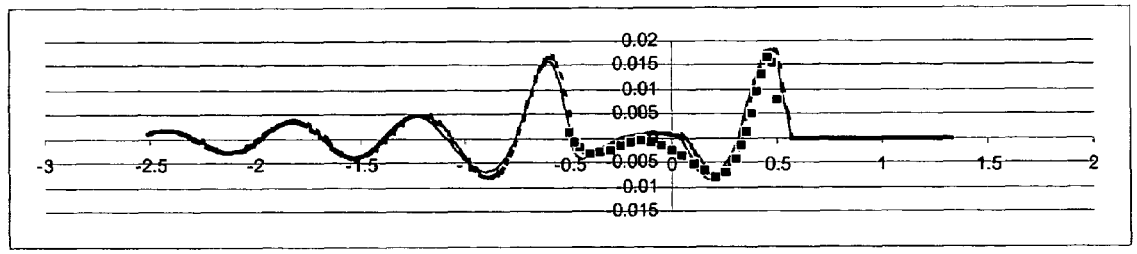
Figure 4C:
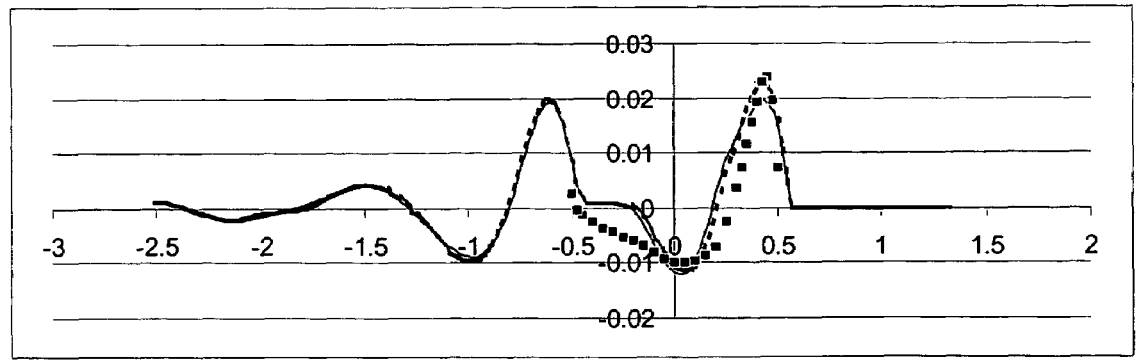

FIG. 4(*a*), FIG. 4(*b*) and FIG. 4(*c*) show normalized wave profiles around the ship. The horizontal axis is along the ship center, and normalized by ship length. The bow of the ship is at 0.5, and the stern of the ship is at −0.5. The vertical axis is wave amplitude and is also normalized by ship length. The dash line represents the nonlinear solution. The solid line represents the linear solutions. The dots represent the measurement. In FIG. 4(*a*), Fr=0.25; in FIG. 4(*b*), Fr=0.316; in FIG. 4(*c*), Fr=0.408. The measurement error at full scale is 6 cm. The scale by ship length 100 m into each of FIG. 4(*a*) through FIG. 4(*c*) will be 0.0006, which is too small to be plotted.

For a quantitative comparison, wave profiles along the ship from inventive nonlinear computations, inventive linear computations and measurements are used. Wave profiles computed using the present invention's pseudo-spectral nonlinear and linear models, and measurements, are shown in FIG. 4(*a*) (wherein Froude number=0.25, FIG. 4(*b*) (wherein Froude number=0.316, and FIG. 4(*c*) (wherein Froude number=0.408). The solid dash lines represent the inventive nonlinear model results, the solid lines represent the inventive linear model results, and the points represent the measurements. For the low Froude number, the wave profiles computed using the present invention's nonlinear and linear models both agree well with the measurements. However, as shown in FIG. 4(*c*), when the Froude number increases, the bow wave of the present invention's nonlinear predictions agrees better with the measurements than does the bow wave of the present invention's linear predictions. When the Froude number is equal to 0.316, the difference in bow wave elevation between the inventive nonlinear computations and the measurements is 3 percent instead of the 6 percent difference between the inventive linear computations and the measurements. When Froude number is 0.408, the difference in bow wave elevations between the inventive nonlinear model predictions and the measurements is 5 percent, and the difference in bow wave elevations between the inventive linear model predictions and the measurements is 20 percent. Therefore, we can conclude that when the Froude number is large, the nonlinear contributions to the bow wave become important even in calm water.

Thus, for small Froude numbers (Fr), the wave patterns of the linear solutions (shown in FIG. 1(*a*) through FIG. 1(*c*)) are similar to those of the nonlinear solutions (shown in FIG. 3(*a*) through FIG. 3(*c*)). However, near the ship body, the ship profiles of the linear solutions (shown in FIG. 2(*a*) through FIG. 2(*c*)) are different from the ship profiles of the nonlinear solutions (shown in FIG. 4(*a*) through FIG. 4(*c*)). This difference increases with the Froude number, as seen clearly in FIG. 4(*a*) through FIG. 4(*c*). In other words, as ships move faster, ship motions can only be appropriately described by fully nonlinear solutions.

Other than the bow waves, the wave profiles from the nonlinear (FIG. 3(*a*) through FIG. 3(*c*)) and linear (FIG. 1(*a*) through FIG. 1(*c*)) computations are very similar, even at a high Froude number. However, the wave profiles from the present invention's nonlinear and linear models are different from the measurements. These differences between inventive model results and measurements increase with increasing Froude number. This suggests that these differences may be due to the sinkage and trim.

Figure 5:
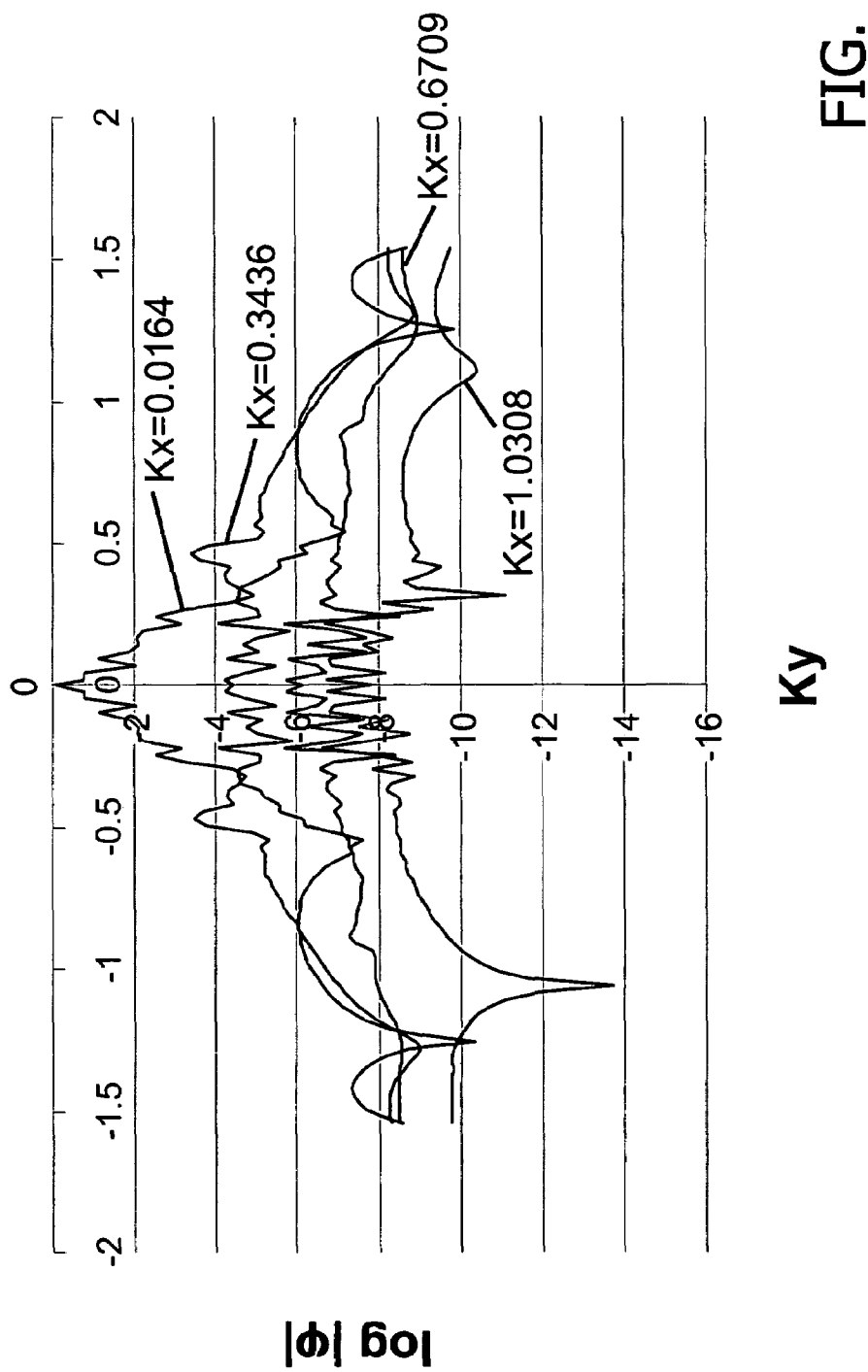
FIG. 5 is a graphical representation showing shows the $\log_{10}|\phi|$ in FIG. 4(b) in wave number space.

In FIG. 5 are plotted the distributions of the absolute velocity potential $|\phi|$ (of the solution in FIG. 4(*b*)) in the spectral (wave number) space. FIG. 5 serves to demonstrate the convergence of the present invention's solutions. FIG. 5 shows that the $\log_{10}|\phi|$ varies with wave number. $|\phi|$ at $k_x=1.0308$ is six orders of magnitude smaller than $|\phi|$ at $k_x=0.0164$. From FIG. 5 one can find that the spectral coefficient for $k_x=1.0308$ is six orders of magnitude smaller than that for $k_x=0.0164$; that is, the convergence is satisfactory. FIG. 5 illustrates rapid decay of the spectral coefficients of $\phi$ as the wave numbers increase; therefore the present invention's numerical solutions are convergent (and hence reliable).

Two cases are now considered to test the present invention's numerical approach to evaluating pressure on the ship hull. The first case is modeling the steady surface waves generated by a Wigley hull, defined as $$y = \frac{B}{2}[1 - 4x^2]\left[1 - \left(\frac{x}{D}\right)^2\right], \quad (30)$$

where B and D are the non-dimensional beam and draft of the ship, respectively. The coordinate is defined such that the longitudinal coordinate x is positive in the direction of the ship travel, the orthogonal transverse coordinate y is positive to port, and the z-coordinate is positive upward. We use the usual values B=0.1, D=0.0625. The first case is examined hereinabove for other algorithms used in the present invention's pseudo-spectral model. The second and more realistic case is that of the Series 60, $C_b$=0.6 hull. The second case is ideal for inventive benchmarking because there are extensive experimental results available (such as wave profiles along the waterline) (Yang et al., 2000), and results from various wave resistance models (Raven, 1998) for different Froude numbers, Fn.

(iii) Wigley Hull Model in Calm Water

The Wigley hull model is a mathematical ship model. The grid points on the ship boundary can be directly evaluated from Equation (30). Hereinabove we use the Wigley hull model to analyze linear and nonlinear results in calm water. One of the present inventors' findings is that nonlinear bow wave results agree better with the experimental data, in particular for large Froude numbers. Here we focus on the nonlinear results with the present invention's new body boundary condition algorithm (Equation (28)).

Figure 6A:
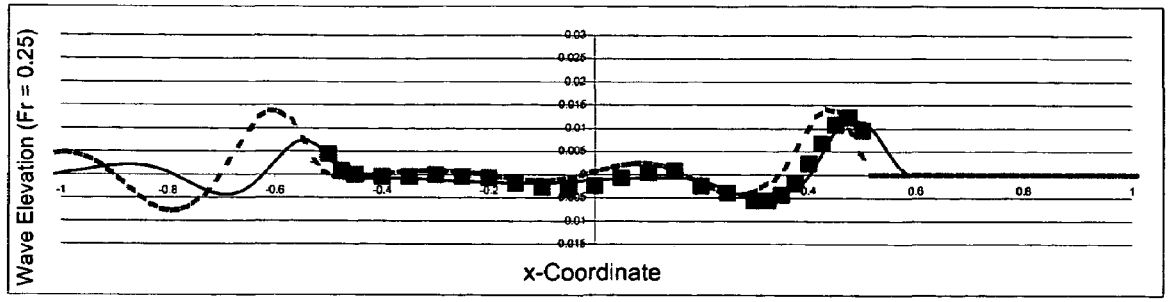
FIG. 6(a), FIG. 6(b) and FIG. 6(c) are graphical representations showing the nonlinear wave profiles around the ship in calm water for Wigley hull. The solid lines represent the ship wave profiles inventively calculated by nonsingular pressure on a moving ship, the dash lines represent the ship wave profiles inventively calculated by singular pressure on a moving ship, and the doc points represent the experimental data from University of Tokyo.
Figure 6B:
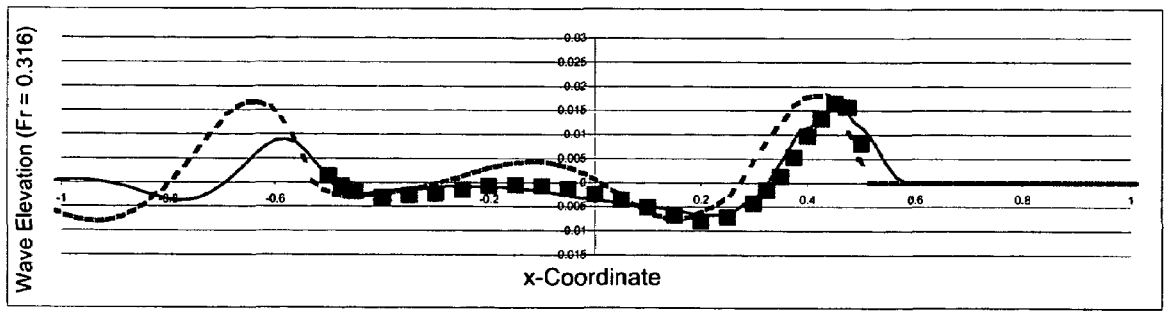
Figure 6C:
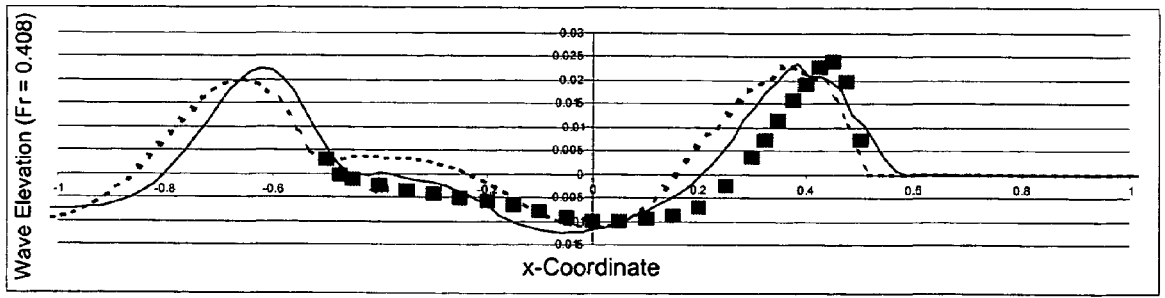

Shown in FIG. 6(a) through FIG. 6(c) are nonlinear wave profiles for Wigley Hull. In this example of inventive modeling, three different Froude numbers are considered, viz., Fn=0.25, 0.316, 0.408. The ship surface is defined with 1512 grid points that are fixed in the reference frame moving with the ship. The numerical results for the wave profile along the ship are shown in FIG. 6(a), FIG. 6(b) and FIG. 6(c). In FIG. 6(a), FIG. 6(b) and FIG. 6(c): the dashed lines represent the results shown in FIG. 2(a), FIG. 2(b) and FIG. 2(c) (where the pressure is evaluated directly); the solid lines are the results from the present invention's non-Cartesian body boundary condition algorithm; and, the points are the experimental measurements from the University of Tokyo (See the aforementioned *Cooperative Experiments on Wigley Parabolic Models in Japan*, Report to the 17$^{th}$ ITTC Resistance Committee, ITTC, 1983) with Fn=0.25 in FIG. 6(a), Fn=0.316 in FIG. 6(b), and Fn=0.408 in FIG. 6(c). The bow is at +0.5, and the stern is at −0.5.

As shown in FIG. 6(a) through FIG. 6(c), the solid lines are the results from the present invention's model (which includes a nonsingular pressure algorithm) on the moving ship. The dashed lines are generally representative of other methods, which include a singular pressure algorithm. The points are the experimental data. Compared to other methods, the present invention's nonsingular pressure algorithmic model results agree much better with the experiments.

From FIG. 6(a), FIG. 6(b) and FIG. 6(c) it is observed that the results from the present invention's non-Cartesian algorithm (solid lines) agree better with the measurements than do the results from the present invention's Cartesian algorithm (dashed lines), especially at small Fn (see FIG. 6(a) and FIG. 6(b)). This indicates that the present invention's non-Cartesian algorithm outperforms the present invention's Cartesian algorithm for the ship pressure calculation. It is also observed from FIGS. 6(a) through 6(c) that the difference between the inventive model results and the measurements increases with the Froude number. Note that the sinkage and the trim are not considered in these calculations.

iv) Series 60, $C_B$=0.6 Hull Model in Calm Water

Figure 7A:
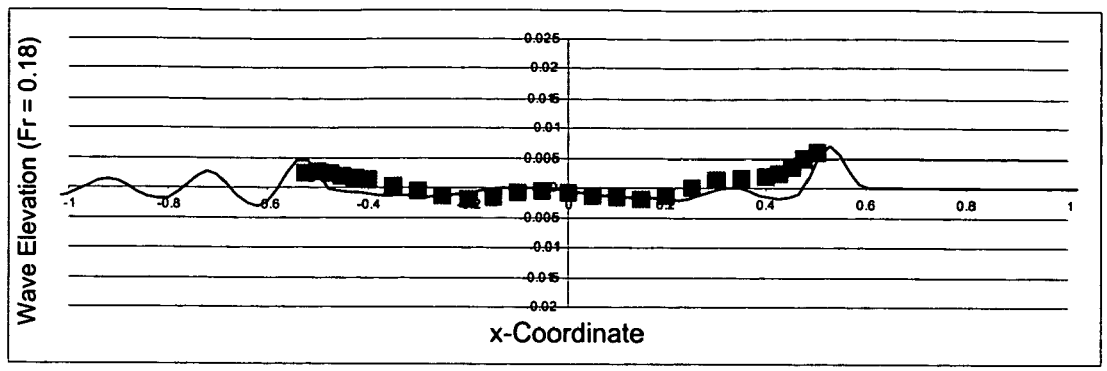
FIG. 7(a), FIG. 7(b) and FIG. 7(c) are graphical representations showing the nonlinear wave profiles around the ship in calm water for Series 60 hull, and $C_b$=0.6. The solid lines represent the ship wave profiles calculated by nonsingular pressure on a moving ship, and the doc points represent the experimental data from University of Tokyo.
Figure 7B:
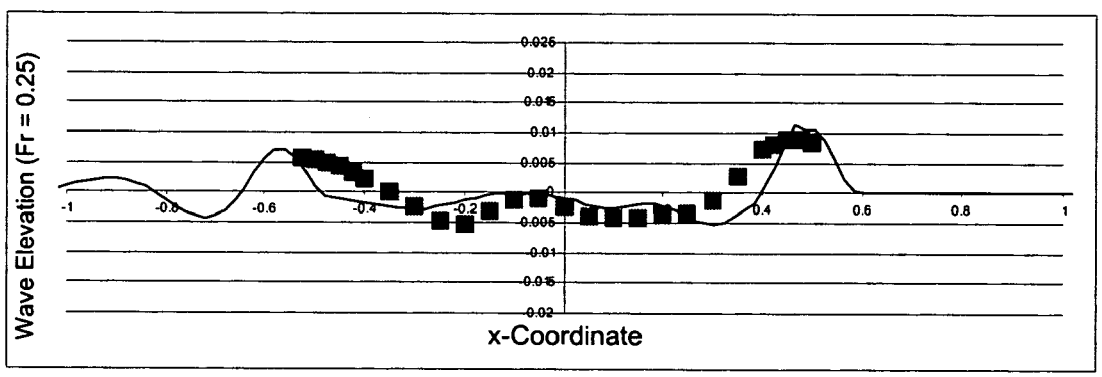
Figure 7C:
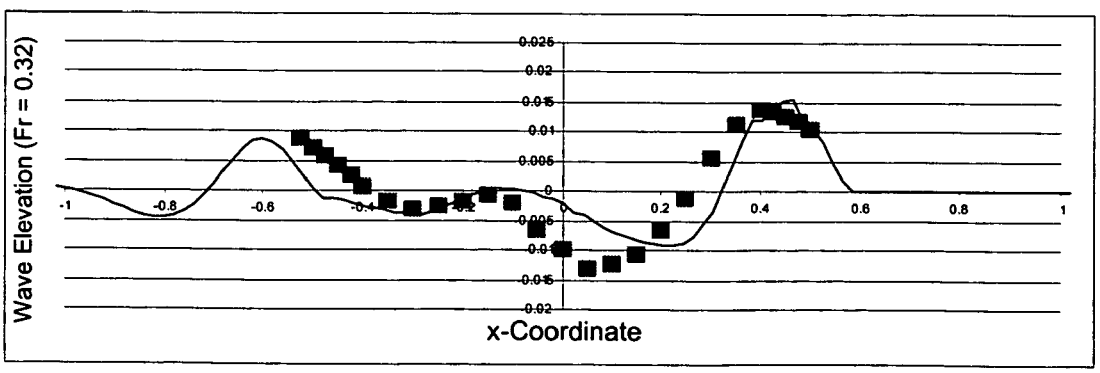

Since a Series 60, $C_B$=0.6 hull is not a simple mathematical body, its boundary is defined on the grid points. In this calculation, there are 7,112 grid points on the ship boundary. Shown in FIG. 7(a) through FIG. 7(c) are nonlinear wave profiles around the ship in calm water for series 60 Hull, and $C_B$=0.6. The solid lines are the results from the inventive model, and the points are the experiment data; they agree well with each other.

Computations of the wave profiles along the hull using the new algorithm (solid lines) and from measurements (points) are shown in FIG. 7(a) through FIG. 7(c). In FIG. 7(a), Fn=0.18; in FIG. 7(b), Fn=0.25; in FIG. 7(c), Fn=0.32. When Fn is small, the numerical results agree well with the measurements; however, as in the first case, the difference between two sets of the results increases with Fn (See esp. FIG. 7(c)). One possible cause of the increase in the difference may be the increasing importance of sinkage and trim (neglected in our computations) for the higher speeds.

Figure 8A:
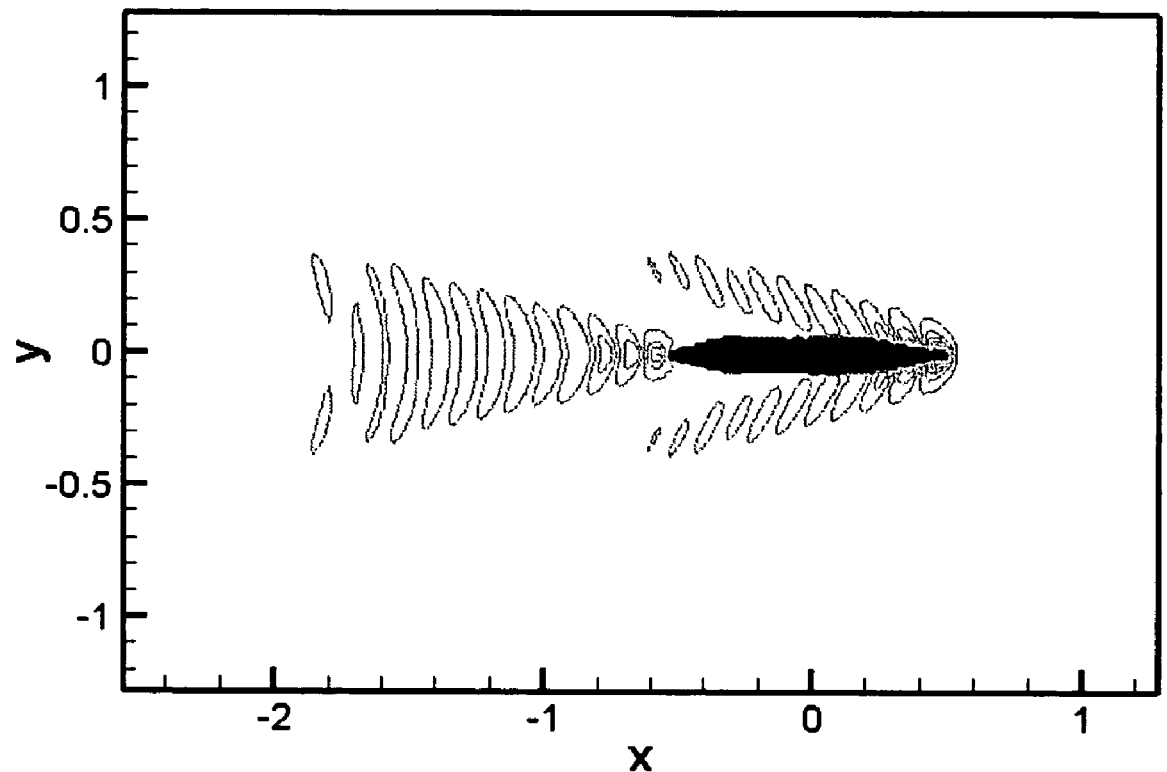
FIG. 8(a), FIG. 8(b) and FIG. 8(c) are graphical representations showing two-dimensional linear ship waves in calm water for Series 60 hull, and $C_b$=0.6.
Figure 8B:
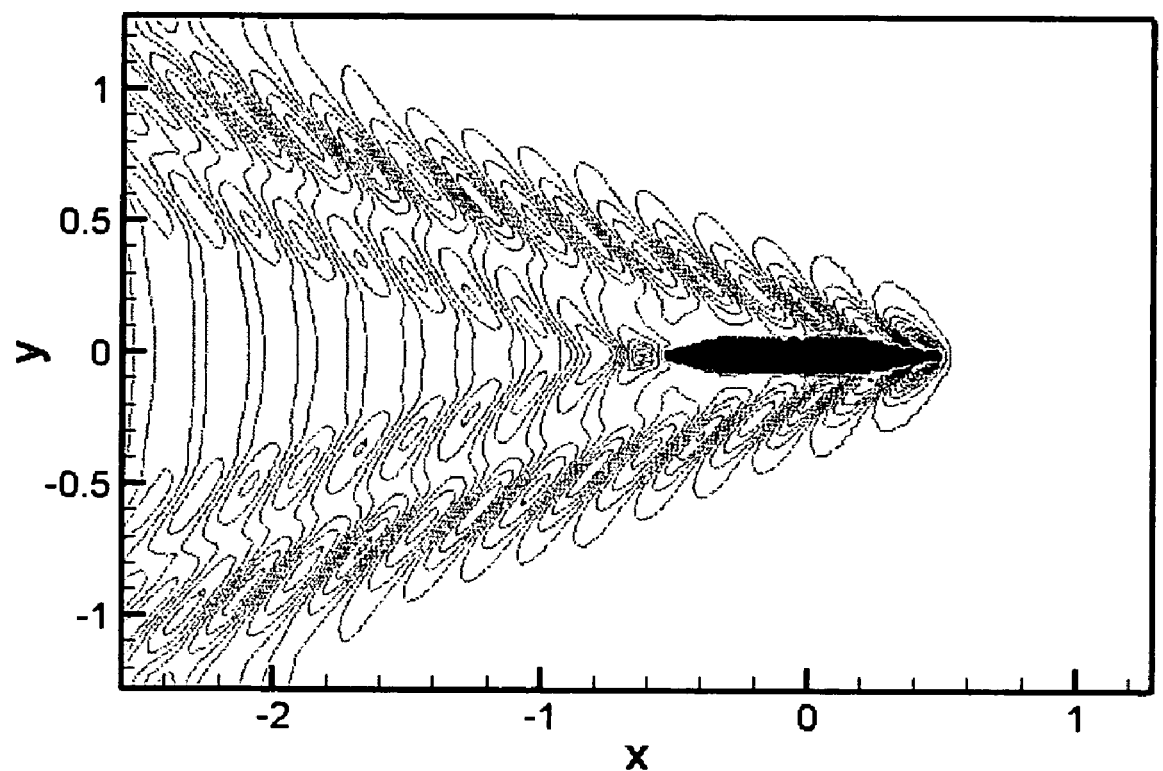
Figure 8C:
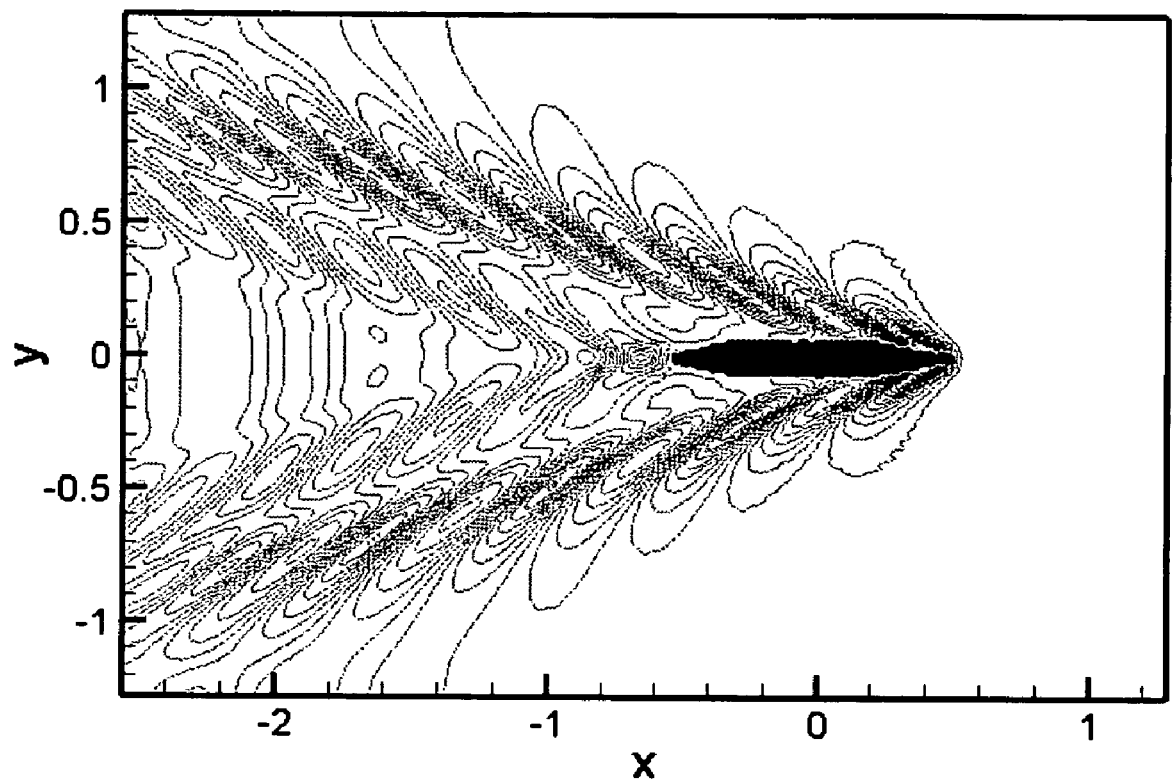

Waves contours (with an increment of 0.0006) are shown in FIG. 8(a) through FIG. 8(c). These wave patterns from the present invention's linear ship motion solutions are for Series 60, $C_B$=0.6. In FIG. 8(a), Fn=0.18; in FIG. 8(b), Fn=0.25; in FIG. 8(c), Fn=0.32. The maximum wave magnitude increases with Fn—i.e., increases from 0.006 in FIG. 8(a), to 0.012 in FIG. 8(b), to 0.018 in FIG. 8(c). All of the intervals of the contour lines are 0.0006. The wave patterns are similar to those of Yang et al. (2000); however, point-to-point comparison is not possible in FIGS. 8(a) through 8(c) due to different contour settings in these figures.

Wave resistance is calculated from the output and is compared with other computed results (Raven, 1998). Following Raven (1998), we examine the $R_w$ computed in two ways, pressure integration over the hull and far-field momentum calculations, $$R_{Wpres} = \iint_\Gamma P_s n_l \cdot ds \quad (31)$$

on the wetted part of the hull surface $\Gamma$, and $$R_{Wfar} = \frac{1}{2}\rho\iint_D \left[-\left(\frac{\partial\phi}{\partial x}\right)^2 + \left(\frac{\partial\phi'}{\partial y}\right)^2 + \left(\frac{\partial\phi'}{\partial z}\right)^2\right]dS + \frac{1}{2}\rho\int_l \zeta^2 dz, \quad (32)$$

over a downstream plane D. In the above expression, $\phi'$ is the disturbance to the uniform flow, and $l_D$ is the intersection of the downstream plane D with the free surface. The wave resistance coefficient is:

$$C_{R_W} = \frac{R_{Wfar}}{\frac{1}{2}\rho\Gamma u_s^2} = \frac{R_{Wpres}}{\frac{1}{2}\rho\Gamma u_s^2}.$$

Figure 9:
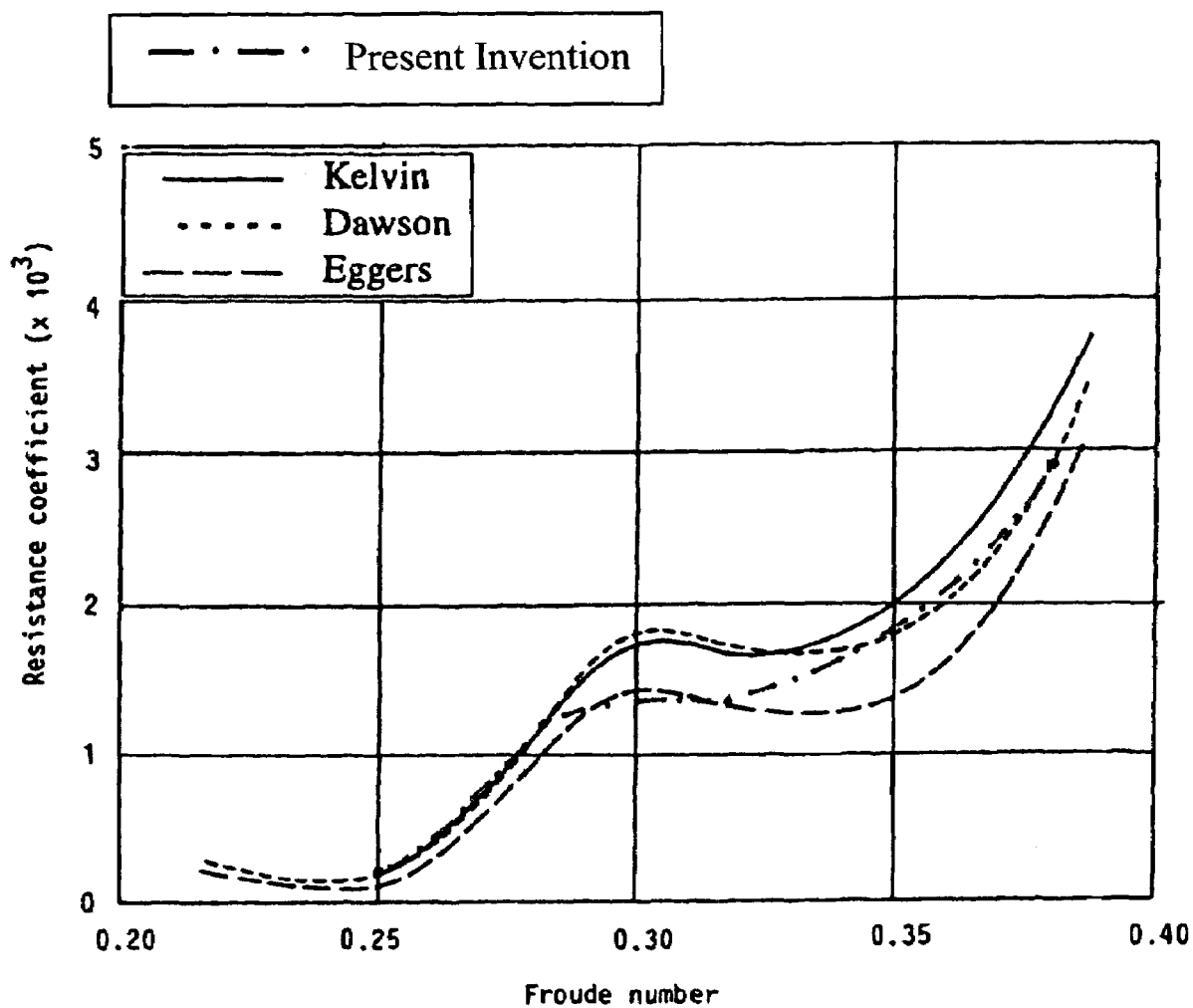
FIG. 9 is a graphical representation of the coefficient of wave-making resistance in calm water. The results by Kelvin (solid line), Dawson (short dash line), and Eggers (long dash line) are adopted from Ravan (1998). The alternating long dash-dot doc line represents the resistance from the present invention's new ship pressure model results.

FIG. 9 shows the distribution of the coefficient of wave-making resistance in calm water. The alternating dash-dot line is calculated from the present invention's nonlinear ship motion model. The inventive results are seen in FIG. 9 to be consistent with other, existing results.

Illustrated in FIG. 9 is the wave resistance computed using the far-field momentum integral at different Froude numbers. The value of the wave resistance coefficient computed using pressure integration over the hull is not shown in FIG. 9 because the maximum relative difference between the two is less than 10 percent. FIG. 9 incorporates information from FIG. 4.1 of Raven (1998) and additionally illustrates inventive results (the dash-dotted line). In FIG. 9 it is seen that the inventive model results agree well with the other model results. The present inventors conjecture that the difference between the results may be due to the sinkage and the trim effects neglected in the inventive pseudo-spectral computations as well as numerical issues and experiment inaccuracies.

CONCLUDING REMARKS

Disclosed herein is the present invention's pseudo-spectral model for nonlinear ship-wave interactions. The present invention's numerical results demonstrate that fully nonlinear ship waves in calm water can be well resolved with the present invention's pseudo-spectral methods. The numerical results also demonstrate that the present invention's nonlinear pseudo-spectral model is more accurate in resolving ship-wave interactions than linear models. For example, the difference in the bow waves obtained with linear or small perturbation models and those measured from experiments increases very rapidly with Froude number. For the Wigley hull, when $F_r=0.408$, the computed linear bow waves are about 20 percent smaller than those from experiments. However, the numerical results from the present invention's nonlinear pseudo-spectral model are only 5 percent smaller, and are thus much closer to the actual measured waves. At low Froude numbers, the difference is negligible. This small difference between the pseudo-spectral numerical results and the experiments may partly result from the fact that the sinkage and trim are not included in the pseudo-spectral results. As is well known, the effect of sinkage and trim increases with increasing Froude number.

The success of the present invention's pseudo-spectral model depends, to some extent, on several key numerical developments. The first is the transformation between the regular pseudo-spectral collocation points and irregular body points on the ship, thus enabling us to model arbitrary ships with little loss of computational efficiency. The second is the multi-domain approach that maximizes the advantage of spectral methods, so that different spatial resolutions can be effectively addressed with moderate truncation levels. The third is the open boundary condition approximation that effectively reduces the dimension of numerical domain, resulting in less computational time.

In addition, the present invention's pseudo-spectral model can effectively simulate interactions between ships and incident gravity waves, because the latter are either the base functions themselves in Equation (8) or linear combinations of the base functions. Modeling surface wave-ship interactions will require careful unification of the present invention's pseudo-spectral steady motion model with a fully nonlinear free surface wave-wave interaction model (Lin and Kuang, 2004). The present inventors plan to pursue this avenue.

The present invention's pseudo-spectral model typically includes a boundary element representation of the ship. This inventive boundary element representation can be in either a Cartesian coordinate system or a non-Cartesian coordinate system. According to typical inventive practice in which the inventive boundary element representation is in a Cartesian coordinate system, a blocked Fourier series representation of the flow is used to solve for the pressure on the hull. According to typical inventive practice in which the inventive boundary element representation is in a non-Cartesian coordinate system, the pressure is solved for in a ship normal vector coordinate system whereby the pressure due to the ship motion through the fluid becomes a smooth function. Comparisons between computational results and experimental data show that the present invention's boundary element method expressed in normal vector coordinates is more accurate than the present invention's boundary element method expressed in Cartesian coordinates.

Presented hereinabove are numerical results for Series 60, $C_B=0.6$ as well as quantitative comparisons of the inventive wave profile along the ship and far-field wave making resistance with experimental data extracted from Raven (1998) and Yang et al. (2000). The difference between the results using the present invention's pressure body boundary condition, versus the experiments, may partly result from the fact that sinkage and trim are not included in the results. It is known that the effect of sinkage and trim increases with the Froude number. Also presented hereinabove are ship wave patterns that are shown to be similar to those existing model results and observed data. This suggests that the fully nonlinear ship waves in calm water can be well resolved with inventive pseudo-spectral methods even with a complicated hull shape, especially when the boundary element representation of the ship is inventively rendered in a normal vector coordinate system. Uniquely and advantageously, the present invention's non-Cartesian coordinate system as applied to ship boundary is characterized by non-singularity. The velocity potential on a moving ship is singular according to inventive practice of a Cartesian coordinate system; in contrast, the velocity potential on a moving ship is non-singular according to inventive practice of a non-Cartesian (normal vector) coordinate system, thus avoiding the discretization and numerical errors.

Worthy of emphasis is the computational efficiency of the present invention's model. Assuming that the numerical resolutions in (x, y) are given by N×N grid points, the typical floating point operations (flops) of the local algorithms (used in the existing models) are of the order $N^2$. In contrast, according to the present invention's model, the flop is of the order N log N. If N=1000, the present invention's model can be 300 times faster than other models. The "speed-up" afforded by inventive practice can be orders of magnitude larger with more grid points (or higher numerical resolutions).

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications and changes to the principles disclosed herein may be made by one skilled in the art without departing from the true scope and spirit of the present invention, which is indicated by the following claims.

What is claimed is:

1. A numerical method for modeling hydrodynamics of a ship and water waves, the numerical method comprising:

determining a boundary described by a ship, said determining of said boundary including determining the pressure at said boundary, said determining of said pressure being contextualized in a ship normal vector coordinate system, said ship normal vector coordinate system being a non-Cartesian coordinate system;

determining a nonlinear interaction between said ship and incident waves, said determining of said nonlinear interaction including using spectral method; and mutually transforming information between said boundary and said nonlinear interaction;

wherein said determining of said pressure includes:

establishing a pressure dichotomy of a ship-absent pressure kind and a ship-present pressure kind, said ship-absence pressure kind being characterized by absence of said ship, said ship-present pressure kind being characterized by presence of said ship, said ship-absent pressure kind including a ship-absent pressure $p_f$ and a ship-absent modified pressure p*, said ship-present pressure kind including a ship-present pressure p and a ship-present pressure correction $\Delta p$, said ship-present pressure p being said pressure being solved for; and obtaining said ship-present pressure p based on said ship-absent pressure $p_f$ and said ship-present pressure correction $\Delta p$, said ship-present pressure p being defined as the sum of said ship-absent pressure $p_f$ and said ship-present pressure correction $\Delta p$, said ship-absent pressure $p_f$ being related to said ship-absent modified pressure p*; said ship-present pressure p being related to said ship-present pressure correction $\Delta p$.

2. The numerical method of claim 1, wherein:

said spectral method is pseudo-spectral method;

said boundary is characterized by irregular body points on said ship;

said nonlinear interaction is characterized by regular pseudo-spectral collocation points;

said mutually transforming of information includes mutually transforming grid-related information between said irregular body points and said regular pseudo-spectral collocation points.

3. The numerical method of claim 1, wherein:

said ship-absent pressure $p_f$ is related to said ship-absent modified pressure p* in accordance with the equation $$p^* \equiv \frac{p_f}{\rho} + \frac{1}{2}(\nabla \psi)^2.$$

where $\rho$ is the fluid density and $\psi$ is the velocity potential;

said ship-present pressure p is related to said ship-present pressure correction $\Delta p$ in accordance with the equation $$\frac{\Delta p}{\rho} = \frac{1}{2}[(\nabla \psi)^2 - (\nabla \varphi)^2] - u_s \cdot (\nabla \psi - \nabla \varphi) + \frac{\partial}{\partial t}(\psi - \varphi) + \nu \nabla^2 (\psi - \varphi),$$

where $u_s$ is the velocity of said ship and $\phi$ is the velocity potential in a reference frame moving with said ship.

4. A computer program product for residence in the memory of a computer, said computer program product comprising a computer-useable medium having computer program logic recorded thereon, said computer program product being for modeling hydrodynamics of a ship and water waves, said computer program logic including:

means for determining a boundary described by a ship, said determining of said boundary including determining the pressure at said boundary, said determining of said pressure being contextualized in a ship normal vector coordinate system, said ship normal vector coordinate system being a non-Cartesian coordinate system;

means for determining a nonlinear interaction between said ship and incident waves, said determining of said nonlinear interaction including using spectral method; and means for mutually transforming information between said boundary and said nonlinear interaction;

wherein said determining of said pressure includes:

establishing a pressure dichotomy of a ship-absent pressure kind and a ship-present pressure kind, said ship-absence pressure kind being characterized by absence of said ship, said ship-present pressure kind being characterized by presence of said ship, said ship-absent pressure kind including a ship-absent pressure $p_f$ and a ship-absent modified pressure p*, said ship-present pressure kind including a ship-present pressure p and a ship-present pressure correction $\Delta p$, said ship-present pressure p being said pressure being solved for; and obtaining said ship-present pressure p based on said ship-absent pressure $p_f$ and said ship-present pressure correction $\Delta p$, said ship-present pressure p being defined as the sum of said ship-absent pressure $p_f$ and said ship-present pressure correction $\Delta p$, said ship-absent pressure $p_f$ being related to said ship-absent modified pressure p*; said ship-present pressure p being related to said ship-present pressure correction $\Delta p$.

5. The computer program product of claim 4, wherein:

said spectral method is pseudo-spectral method;

said boundary is characterized by irregular body points on said ship;

said nonlinear interaction is characterized by regular pseudo-spectral collocation points;

said mutually transforming of information includes mutually transforming grid-related information between said irregular body points and said regular pseudo-spectral collocation points.

6. The computer program product of claim 4, wherein:

said ship-absent pressure $p_f$ is related to said ship-absent modified pressure p* in accordance with the equation $$p^* \equiv \frac{p_f}{\rho} + \frac{1}{2}(\nabla \psi)^2,$$

where $\rho$ is the fluid density and $\psi$ is the velocity potential;

said ship-present pressure p is related to said ship-present pressure correction $\Delta p$ in accordance with the equation $$\frac{\Delta p}{\rho} = \frac{1}{2}[(\nabla \psi)^2 - (\nabla \varphi)^2] - u_s \cdot (\nabla \psi - \nabla \varphi) + \frac{\partial}{\partial t}(\psi - \varphi) + \nu \nabla^2 (\psi - \varphi),$$

where $u_s$ is the velocity of said ship and $\phi$ is the velocity potential in a reference frame moving with said ship.

7. A numerical method for determining pressure on a ship, the numerical method comprising:

establishing a pressure dichotomy of a ship-absent pressure kind and a ship-present pressure kind, said ship-absence pressure kind being characterized by absence of said ship, said ship-present pressure kind being characterized by presence of said ship, said ship-absent pressure kind including a ship-absent pressure $p_f$ and a ship-absent modified pressure p*, said ship-present pressure kind including a ship-present pressure p and a ship-present pressure correction $\Delta p$, said ship-present pressure p being said pressure being solved for;

obtaining said ship-present pressure p based on said ship-absent pressure $p_f$ and said ship-present pressure correction Δp, said obtaining of said ship-present pressure p including computer-generating and displaying data representative of said ship present pressure p, said ship-present pressure p being defined as the sum of said ship-absent pressure $p_f$ and said ship-present pressure correction Δp, said ship-absent pressure $p_f$ being related to said ship-absent modified pressure p*; said ship-present pressure p being related to said ship-present pressure correction Δp.

8. The numerical method of claim 7, wherein:

said ship-absent pressure $p_f$ is related to said ship-absent modified pressure p* in accordance with the equation $$p^* \equiv \frac{p_f}{\rho} + \frac{1}{2}(\nabla \psi)^2,$$

where ρ is the fluid density and ψ is the velocity potential;

said ship-present pressure p is related to said ship-present pressure correction Δp in accordance with the equation $$\frac{\Delta p}{\rho} = \frac{1}{2}[(\nabla \psi)^2 - (\nabla \varphi)^2] - u_s \cdot (\nabla \psi - \nabla \varphi) + \frac{\partial}{\partial t}(\psi - \varphi) + \nu \nabla^2 (\psi - \varphi),$$

where $u_s$ is the velocity of said ship and φ is the velocity potential in a reference frame moving with said ship.

* * * * *